United States Patent
Otsuka et al.

(10) Patent No.: US 10,781,352 B2
(45) Date of Patent: Sep. 22, 2020

(54) POWDER OF HEXAGONAL BORON NITRIDE, PROCESS FOR PRODUCING SAME, RESIN COMPOSITION, AND RESIN SHEET

(71) Applicant: SHOWA DENKO K.K., Tokyo (JP)

(72) Inventors: Yuki Otsuka, Yokohama (JP); Masaru Fukasawa, Shiojiri (JP)

(73) Assignee: SHOWA DENKO K.K., Tokyo (JP)

( * ) Notice: Subject to any disclaimer, the term of this patent is extended or adjusted under 35 U.S.C. 154(b) by 235 days.

(21) Appl. No.: 15/744,426

(22) PCT Filed: Aug. 19, 2016

(86) PCT No.: PCT/JP2016/074278
§ 371 (c)(1),
(2) Date: Jan. 12, 2018

(87) PCT Pub. No.: WO2017/038512
PCT Pub. Date: Mar. 9, 2017

(65) Prior Publication Data
US 2018/0201818 A1 Jul. 19, 2018

(30) Foreign Application Priority Data
Sep. 3, 2015 (JP) ................................ 2015-174106

(51) Int. Cl.
*C09K 5/14* (2006.01)
*C08K 3/38* (2006.01)
*C08L 101/00* (2006.01)
*C01B 21/064* (2006.01)
*C08K 7/00* (2006.01)

(52) U.S. Cl.
CPC .............. *C09K 5/14* (2013.01); *C01B 21/064* (2013.01); *C01B 21/0645* (2013.01); *C08K 3/38* (2013.01); *C08K 7/00* (2013.01); *C08L 101/00* (2013.01); *C01P 2002/60* (2013.01); *C01P 2004/03* (2013.01); *C01P 2004/50* (2013.01); *C01P 2004/61* (2013.01); *C01P 2006/11* (2013.01); *C01P 2006/12* (2013.01); *C01P 2006/32* (2013.01); *C08K 2003/385* (2013.01); *C08K 2201/001* (2013.01); *C08K 2201/003* (2013.01); *C08K 2201/005* (2013.01); *C08K 2201/006* (2013.01)

(58) Field of Classification Search
CPC ...... C09K 5/14; C08K 2201/003; C08K 3/38; C08K 7/00; C08K 2003/385; C08K 2201/001; C08K 2201/005; C08K 2201/006; C01P 2004/50; C01P 2006/32; C01P 2004/61; C01P 2006/12; C01P 2002/60; C01P 2006/11; C01P 2004/03; C01B 21/0645
USPC ........................................................ 524/404
See application file for complete search history.

(56) References Cited

U.S. PATENT DOCUMENTS

| | | | |
|---|---|---|---|
| 4,784,978 A | 11/1988 | Ogasawara et al. | |
| 5,714,275 A * | 2/1998 | Yamazaki | G11B 5/70605 428/842.3 |
| 6,054,520 A | 4/2000 | Washio et al. | |
| 2010/0226095 A1 | 9/2010 | Mimura et al. | |
| 2012/0196128 A1 | 8/2012 | Gohara et al. | |
| 2014/0327335 A1 | 11/2014 | Mabuchi et al. | |
| 2015/0105521 A1 | 4/2015 | Shoji et al. | |
| 2015/0152251 A1 | 6/2015 | Koshida et al. | |
| 2016/0023907 A1* | 1/2016 | Handl | B02C 19/061 428/402 |
| 2016/0145411 A1* | 5/2016 | Uibel | C08K 9/02 524/404 |
| 2016/0340191 A1* | 11/2016 | Ikemiya | C01B 21/0648 |

FOREIGN PATENT DOCUMENTS

| | | |
|---|---|---|
| CN | 103930957 A | 7/2014 |
| CN | 104428368 A | 3/2015 |
| JP | 60-260405 A | 12/1985 |
| JP | 61-286207 A | 12/1986 |
| JP | 05-085482 B2 | 12/1993 |
| JP | 11-060216 A | 3/1999 |
| JP | 3461651 B2 | 10/2003 |
| JP | 2004-301632 A | 10/2004 |
| JP | 2005-343728 A | 12/2005 |
| JP | 2011-098882 A | 5/2011 |
| JP | 4750220 B2 | 8/2011 |
| JP | 5081488 B2 | 11/2012 |
| JP | 2018-104260 A | 7/2018 |
| WO | 2009/041300 A1 | 4/2009 |
| WO | 2014/202652 A1 | 12/2012 |
| WO | 2014/003193 A1 | 1/2014 |
| WO | 2014/202649 A1 | 12/2014 |
| WO | 2015/119198 A1 | 8/2015 |
| WO | 2016/092951 A1 | 6/2016 |

OTHER PUBLICATIONS

Polar Therm Boron Nitride Powder PTX25 and PTX60, 2012. (Year: 2012).*
Extended European Search Report dated Mar. 18, 2019 in application No. 16841544.6.
Observations on Patentability by Third Party dated Mar. 26, 2019 from the European Patent Office in application No. 16841544.6.

(Continued)

*Primary Examiner* — Hui H Chin
(74) *Attorney, Agent, or Firm* — Sughrue Mion, PLLC

(57) ABSTRACT

A hexagonal boron nitride (hBN) powder containing an aggregate of primary particles of hBN, in which the powder has a primary particle size of less than 10 μm, a ratio of an average longer diameter ($L_1$) to an average thickness ($d_1$) of the primary particles, [$L_1/d_1$], of 5.0 or more and 20 or less, and a BET specific surface area of less than 10 m²/g. The powder has one maximum peak in a range of a particle size of 45 μm or more and 150 μm or less in a particle size distribution curve of a hexagonal boron nitride powder classified to have a particle size of 45 μm or more and 106 μm or less, and has a decrease rate of the maximum peak of 10% or more and less than 40%.

12 Claims, 3 Drawing Sheets

(56) References Cited

OTHER PUBLICATIONS

"PolarTherm Boron Nitride Powder Grade PT110", Momentive performance materials, Shanghai Ping Yiao Trading Co., Ltd., 2019, 2 pages (3 pages).
International Search Report of PCT/JP2016/074278 dated Sep. 20, 2016.
"PolarTherm* Boron Nitride Powder", Momentive, 2012, PTX25 and PTX60, (total 2 pages).
"PolarTherm* and PolarTherm PTX* Boron Nitride Fillers", Motentive, [Internet] retrieved on Mar. 2, 2018, <URL: https://momentive.com/ja-jp/brands/polartherm-and-polatherm-ptx/#>, (total 6 pages).
Masaji Arimura et al., "Effects of frequencies on the cracking of nanoparticles using ultrasonic irradiation", Fukuoka Industrial Technology Center, SCEJ 38th Autumn Meeting. 2006, F224, (total 5 pages).
Certificate of Experimental Result, Mar. 14, 2018, Material 1, (total 8 pages).
Certificate of Experimental Result, Mar. 14, 2018, Material 2, (total 6 pages).
L. Motevalizadeh et al., "Facile template-free hydrothermal synthesis and microstrain measurement of ZnO nanorods", Bull. Matter. Sci., May 2014, col. 37, No. 3, pp. 397-405.
Communication dated Mar. 19, 2018 from the Japanese Patent Office in counterpart Application No. 2017-537747.
Communication dated Mar. 20, 2018 from the Japanese Patent Office in counterpart Application No. 2017-537747.
Office Action dated Jan. 6, 2020 in corresponding Chinese Application No. 201680043477.5

\* cited by examiner

[Fig. 1]
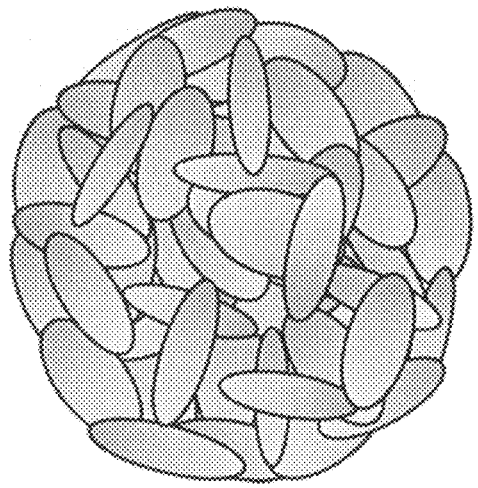
[Fig. 2]
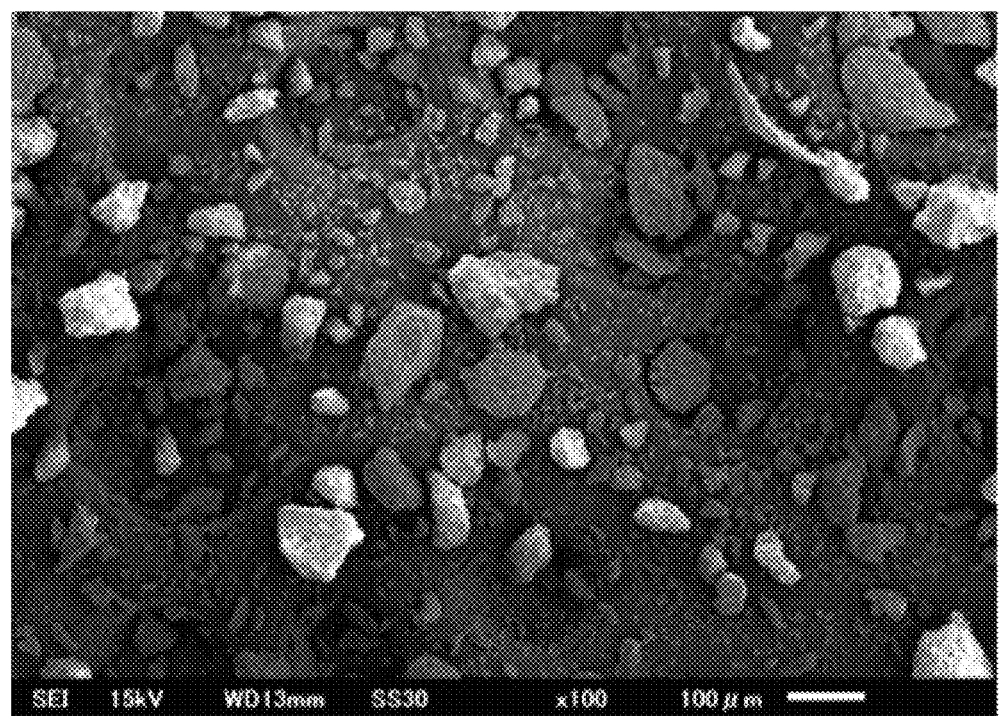

[Fig. 3]
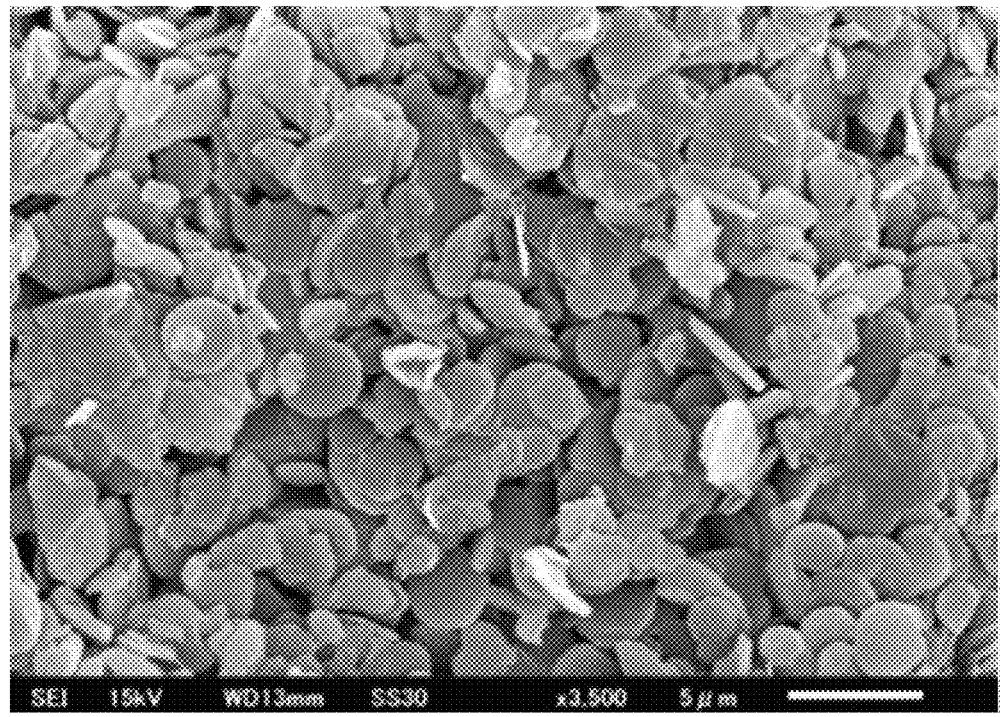
[Fig. 4]
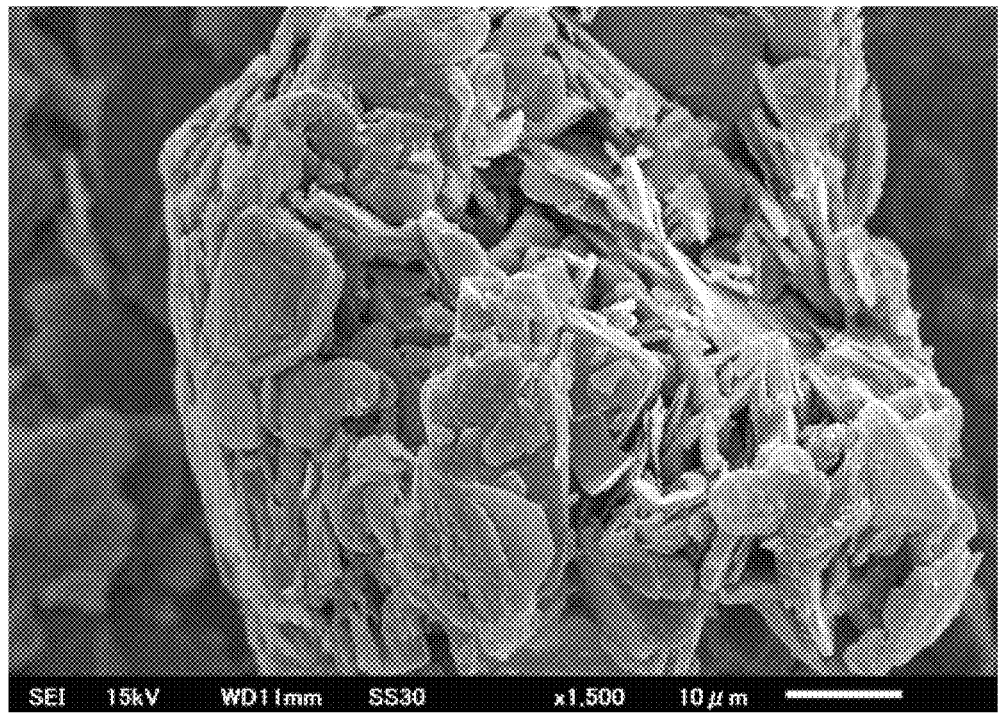

[Fig. 5]
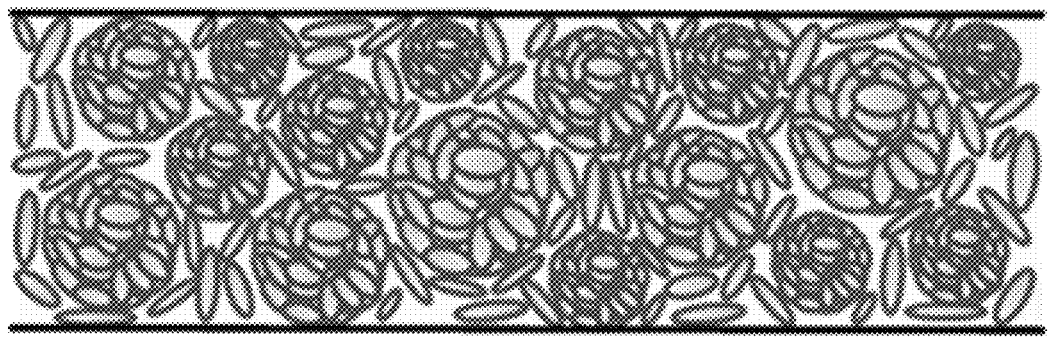
[Fig. 6]
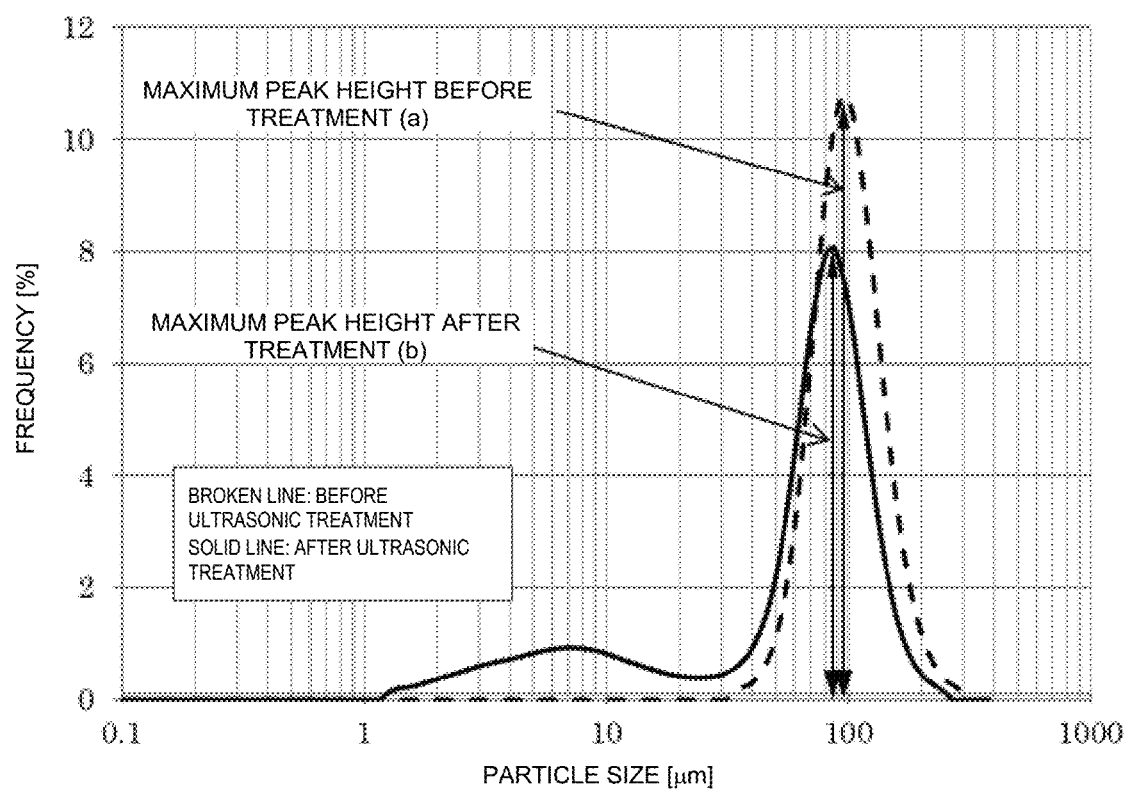

POWDER OF HEXAGONAL BORON NITRIDE, PROCESS FOR PRODUCING SAME, RESIN COMPOSITION, AND RESIN SHEET

CROSS REFERENCE TO RELATED APPLICATIONS

This application is a National Stage of International Application No. PCT/JP2016/074278 filed Aug. 19, 2016, claiming priority based on Japanese Patent Application No. 2015-174106 filed Sep. 3, 2015, the contents of all of which are incorporated herein by reference in their entirety.

TECHNICAL FIELD

The present invention relates to a hexagonal boron nitride (hereinafter, also simply referred to as "hBN") powder, and a resin sheet comprising the hBN powder and particularly relates to a high-purity hBN powder comprising an aggregate comprising primary particles of hBN (hereinafter, also simply referred to as "aggregate"), a method for producing the hBM powder, and a resin composition and a resin sheet each comprising the hBN powder.

BACKGROUND ART

An hBN particle has a layered structure similar to that of graphite, has excellent properties such as thermal conductive properties, electric insulation, chemical stability, lubricating properties as a solid, and thermal shock resistance, and therefore is used as an insulation/heat dissipation material, a solid lubricant, solid mold release agent, a raw material for producing an hBN sintered body, and the like taking advantage of these properties.

Conventionally, the hBN powder has generally been obtained by mixing a boron compound such as boric acid or borax and a nitrogen compound such as melamine or urea, then firing the resultant mixture at a relatively low temperature under an ammonia atmosphere or a non-oxidizing gas atmosphere to produce a crude hBN powder having a low crystallinity, and subsequently firing the obtained crude hBN powder at a high temperature under a non-oxidizing gas atmosphere to allow the crystals to grow (PTLs 1 to 3).

A sheet, tape, grease, or the like in which such an hBN powder is contained as a filler in a resin material such as an epoxy resin, silicone rubber, or the like is used as a thermally conductive member, such as, for example, a thermally conductive sheet or thermally conductive grease having electric insulation, for effectively dissipating heat generated from an electronic component. To further improve the thermal conductive properties of these thermally conductive members, attempts to increase the filling rate of the hBN powder in the thermally conductive members are being made.

However, the primary particle of hBN generally has a scale-like particle shape, and the ratio of the average longer diameter to the average thickness of the primary particles is high, and therefore when the filling rate is increased, the primary particles easily face in a constant direction and the anisotropy easily occurs in properties of a molded article, such as a thermally conductive sheet, obtained by molding a resin composition comprising the hBN powder. When such anisotropy occurs, the properties such as the thermal conductive properties, the electric insulation, and the thermal heat resistance are lowered.

Therefore, in recent years, a method for mixing the hBN powder comprising secondary particles (aggregate) in which primary particles of hBN aggregate with a resin has been used for the purpose of improving the filling rate of the hBN powder and suppressing anisotropy in a thermally conductive sheet (PTLs 4, 5).

However, when the strength of the aggregate is not sufficient, there is a problem that the aggregate disintegrates in a process of forming a composite with the resin, so that the anisotropy occurs in the thermally conductive sheet and the filling rate of the hBN powder in the thermally conductive sheet cannot be increased sufficiently because the disintegration of the aggregate needs to be prevented, thereby lowering the thermal conductive properties.

Thus, attempts to obtain the hBN powder by subjecting boron carbide to nitriding treatment under a condition of 1800° C. or more in a nitrogen atmosphere, then mixing a resultant product with diboron trioxide or a precursor thereof, thereafter firing the resultant mixture, and removing a carbon component after that have been made for the purpose of improving the filling rate of the hBN powder in a thermally conductive sheet and improving the thermal conductive properties (PTLs 6, 7).

However, the reaction rate for forming boron nitride from boron carbide is very slow, and therefore there is a problem that it requires a long time in a method involving reacting only boron carbide with nitrogen, thereby increasing production cost. Moreover, the thermal conductive properties of the hBN powder obtained by the production method are still insufficient and therefore further improvement has been desired.

CITATION LIST

Patent Literature

PTL1: JP 61-286207 A
PTL2: JP 3461651 B
PTL3: JP 5-85482 B
PTL4: JP 2011-098882 A
PTL5: JP 2005-343728 A
PTL6: JP 4750220 B
PTL7: JP 5081488 B

SUMMARY OF INVENTION

Technical Problem

The present invention intends to provide a high-purity hBN powder comprising an aggregate comprising primary particles of hBN, the hBN powder having a more suppressed anisotropy than conventional hBN powders and having superior thermal conductive properties, a method for producing the hBN powder, and a resin composition and a resin sheet each comprising the hBN powder.

Solution to Problem

The present inventors have conducted diligent studies to find that the problems can be solved by an hBN powder comprising an aggregate comprising primary particles of hBN, the hBN powder having a primary particle size, a ratio of an average longer diameter ($L_1$) to an average thickness ($d_1$) of the primary particles, [$L_1/d_1$] (hereinafter, also simply referred to as "ratio [$L_1/d_1$]"), and a BET specific surface area in a particular range, and having a strength of the aggregate in a particular range. Moreover, the present inventors have found that the strength of the aggregate can be adjusted by focusing on a decrease rate of a maximum peak when a dispersion liquid obtained by dispersing in water a hexagonal boron nitride powder having one maximum peak in a particular range in a particle size distribution curve of the hBN powder is subjected to an ultrasonic treatment for 1 minute.

The present invention is based on the above-described findings.

That is, the present invention provides the following [1] to [13].

[1] A hexagonal boron nitride powder comprising an aggregate of primary particles of hexagonal boron nitride, wherein the powder has a primary particle size of less than 10 μm, a ratio of an average longer diameter ($L_1$) to an average thickness ($d_1$) of the primary particles, [$L_1/d_1$], of 5.0 or more and 20 or less, and a BET specific surface area of less than 10 m$^2$/g, and the powder has one maximum peak in a range of a particle size of 45 μm or more and 150 μm or less in a particle size distribution curve of the hexagonal boron nitride powder classified to have a particle size of 45 μm or more and 106 μm or less, and has a decrease rate of the maximum peak of 10% or more and less than 40% when a dispersion liquid obtained by dispersing the hexagonal boron nitride powder in water is subjected to an ultrasonic treatment for 1 minute, the peak decrease rate being calculated by the following expression (1):

Peak decrease rate=[(maximum peak height before treatment(a))−(maximum peak height after treatment(b))]/(maximum peak height before treatment(a))   (1).

[2] The hexagonal boron nitride powder according to [1], having a BET specific surface area of 1.5 m$^2$/g or more and 6.0 m$^2$/g or less.

[3] The hexagonal boron nitride powder according to [1] or [2], having a BET specific surface area of 1.5 m$^2$/g or more and 5.0 m$^2$/g or less.

[4] The hexagonal boron nitride powder according to any one of [1] to [3], having a crystallite size of 260 Å or more and 1000 Å or less.

[5] The hexagonal boron nitride powder according to any one of [1] to [4], having a bulk density of 0.50 g/cm$^3$ or more.

[6] A resin composition comprising 10% by volume or more and 90% by volume or less of the hexagonal boron nitride powder according to any one of [1] to [5].

[7] A resin sheet comprising the resin composition according to [6] or a cured product thereof.

[8] A method for producing the hexagonal boron nitride powder according to any one of [1] to [5], the method comprising a step of mixing 100 parts by mass of a mixed powder comprising 50% by mass or more and 90% by mass or less of a boron nitride fine powder (A) and 10% by mass or more and 50% by mass or less of a boron compound (B) represented by a formula ($B_2O_3$).($H_2O$)$_X$ wherein X=0 to 3, 1.0 part by mass or more and 15 parts by mass or less in terms of carbon of a carbon source (C), molding a resultant mixture, and then firing a resultant mixture under an atmosphere comprising a nitrogen gas, wherein the boron nitride fine powder (A) has a ratio of an average longer diameter ($L_2$) to an average thickness ($d_2$) of primary particles thereof, [$L_2/d_2$], of 2.0 or more and 15 or less, a 50% volume cumulative particle size $D_{50}$ of 0.20 μm or more and 5.0 μm or less, a BET specific surface area of 5.0 m$^2$/g or more and 30 m$^2$/g or less, and a crystallite size of 150 Å or more and 400 Å or less.

[9] The method for producing the hexagonal boron nitride powder according to [8], wherein the boron nitride fine powder (A) has a 50% volume cumulative particle size $D_{50}$ of 0.20 μm or more and 1.0 μm or less.

[10] The method for producing the hexagonal boron nitride powder according to [8] or [9], wherein the boron nitride fine powder (A) has a BET specific surface area of 5.0 m$^2$/g or more and 20 m$^2$/g or less.

[11] The method for producing the hexagonal boron nitride powder according to any one of [8] to [10], wherein the boron nitride fine powder (A) has a crystallite size of 200 Å or more and 400 Å or less.

[12] The method for producing the hexagonal boron nitride powder according to any one of [8] to [11], the method comprising a step of mixing 100 parts by mass of the mixed powder comprising 50% by mass or more and 90% by mass or less of the boron nitride fine powder (A) and 10% by mass or more and 50% by mass or less of the boron compound (B) represented by the formula ($B_2O_3$).($H_2O$)$_X$ wherein X=0 to 3, and 1.0 part by mass or more and 15 parts by mass or less in terms of carbon of the carbon source (C), molding the resultant mixture, and then firing the resultant under an atmosphere comprising a nitrogen gas, wherein the boron nitride fine powder (A) has a ratio of the average longer diameter ($L_2$) to the average thickness ($d_2$) of primary particles thereof, [$L_2/d_2$], of 2.0 or more and 15 or less, a 50% volume cumulative particle size $D_{50}$ of 0.20 μm or more and 1.0 μm or less, a BET specific surface area of 5.0 m$^2$/g or more and 20 m$^2$/g or less, and a crystallite size of 200 Å or more and 400 Å or less.

[13] The method for producing the hexagonal boron nitride powder according to any one of [8] and [12], wherein the carbon source (C) is at least one selected from the group consisting of graphite and boron carbide.

Advantageous Effects of Invention

According to the present invention, a high-purity hBN powder comprising an aggregate comprising primary particles of hBN, the hBN powder having a more suppressed anisotropy than conventional hBN powders and having superior thermal conductive properties, a method for producing the hBN powder, and a resin composition and a resin sheet each comprising the hBN powder can be provided.

BRIEF DESCRIPTION OF DRAWINGS

FIG. 1 is a schematic diagram of an aggregate of primary particles of hBN according to the present invention.

FIG. 2 is an SEM image of an aggregate of primary particles of hBN obtained in Example 1.

FIG. 3 is an enlarged SEM image of an aggregate of primary particles of hBN obtained in Example 1.

FIG. 4 is an enlarged SEM image of an aggregate of primary particles of hBN obtained in Comparative Example 2.

FIG. 5 is a schematic diagram of a resin sheet comprising a hexagonal boron nitride powder according to the present invention.

FIG. 6 is a graph showing particle size distribution curves before and after an ultrasonic treatment of Example 1.

DESCRIPTION OF EMBODIMENTS

[Hexagonal Boron Nitride Powder]

The hexagonal boron nitride powder according to the present invention is a hexagonal boron nitride powder comprising an aggregate of primary particles of hexagonal boron nitride, wherein the powder has a primary particle size of less than 10 μm, a ratio, $[L_1/d_1]$, of the primary particles of 5.0 or more and 20 or less, and a BET specific surface area of less than 10 m²/g, and the powder has one maximum peak in a range of a particle size of 45 μm or more and 150 μm or less in a particle size distribution curve of the hexagonal boron nitride powder classified to have a particle size of 45 μm or more and 106 μm or less, and has a decrease rate of the maximum peak of 10% or more and less than 40% when a dispersion liquid obtained by dispersing the hexagonal boron nitride powder in water is subjected to an ultrasonic treatment for 1 minute, the peak decrease rate being calculated by the following expression (1).

Peak decrease rate=[(maximum peak height before treatment(a))−(maximum peak height after treatment(b))]/(maximum peak height before treatment(a))   (1)

According to the present invention, a high-purity hBN powder comprising an aggregate comprising primary particles of hBN, the hBN powder having a more suppressed anisotropy than conventional hBN powders and having superior thermal conductive properties can be obtained. The reason that such an effect is obtained is not clear but is considered as follows.

The hBN powder according to the present invention comprises a dense aggregate because the primary particles of hBN which form the aggregate have a particle size in a particular range and have a ratio [L1/d1] and a BET specific surface area each in a particular range, and the hBN powder according to the present invention also comprises a strong aggregate because the strength of the aggregate measured under a particular condition is in a particular range. Therefore, the aggregate can maintain a granular shape without disintegrating in the process of forming a composite with a resin, and the filling rate of the hBN powder in a resin composition can be improved. It is considered that as a result, high thermal conductive properties can be exhibited.

Moreover, it is inferred that facing of the primary particles in a constant direction due to the disintegration of the aggregate can be suppressed and the anisotropy can be suppressed because the hBN powder according to the present invention comprises a dense and strong aggregate.

However, these are estimates, and the present invention is not limited to these mechanisms.

<Primary Particles>

The primary particle size of the hBN powder according to the present invention is less than 10 μm, preferably 0.50 μm or more and less than 10 μm, more preferably 1.0 μm or more and 8.0 μm or less, still more preferably 1.0 μm or more and 6.0 μm or less, further still more preferably 1.5 μm or more and 5.0 μm or less, further still more preferably 2.0 μm or more and 5.0 μm or less, and further still more preferably 2.0 μm or more and 4.0 μm or less in average from the viewpoint of improvements in the thermal conductive properties. In the hBN powder comprising a dense aggregate comprising small primary particles having a primary particle size of less than 10 μm, the aggregate can maintain the granular shape without disintegrating in the process of forming a composite with a resin, and the filling rate in a resin composition can be improved. Therefore, the thermal conductive properties can be improved.

It is to be noted that the primary particle size is a numerical average value of longer diameters of the primary particles and is measured by the method described in Examples.

The primary particles contained in the hBN powder according to the present invention are scale-like. The "scale-like" herein means a shape having a ratio of an average longer diameter ($L_1$) to an average thickness ($d_1$), $[L_1/d_1]$, for the primary particles of 5.0 or more and 20 or less. Even in the case where the primary particles are scale-like in this way, the primary particles form an aggregate, and therefore the filling rate of the hBN powder in a resin composition can be improved. Moreover, the strength of the aggregate is high, and therefore the disintegration of the aggregate can be suppressed, and orientation of the primary particles in a constant direction can be prevented or suppressed, so that the anisotropy can be suppressed.

In the present specification, the "average longer diameter" means a number average value of the longer diameters of the primary particles, and the "average thickness" means a number average value of the thicknesses of the primary particles. In addition, the "longer diameter" means the maximum diameter in a planar direction of a scale-like particle.

The ratio $[L_1/d_1]$ for the primary particles in the hBN powder according to the present invention is 5.0 or more and 20 or less, preferably 7.0 or more and 18 or less, more preferably 9.0 or more and 17 or less, still more preferably 9.5 or more and 16 or less, further still more preferably 10 or more and 15 or less, and further still more preferably 10.5 or more and 14.5 or less from the viewpoint of suppressing the anisotropy and improving the thermal conductive properties.

It is to be noted that the ratio $[L_1/d_1]$ for the primary particles contained in the hBN powder is measured by the method described in Examples.

<hBN Powder>

The BET specific surface area of the hBN powder according to the present invention is less than 10 m²/g, preferably 1.0 m²/g or more and 9.5 m²/g or less, more preferably 1.5 m²/g or more and 9.0 m²/g or less, still more preferably 1.5 m²/g or more and 8.0 m²/g or less, further still more preferably 2.0 m²/g or more and 7.0 m²/g or less, further still more preferably 2.5 m²/g or more and 6.0 m²/g or less, further still more preferably 3.0 m²/g or more and 5.0 m²/g or less, and further still more preferably 3.5 m²/g or more and 4.5 m²/g or less from the viewpoint of improvements in the thermal conductive properties. When the BET specific surface area is less than 10 m²/g, the specific surface area of the aggregate contained in the hBN powder is also small and the amount of a resin component to be taken in the aggregate in producing a resin composition is small. Therefore, it is considered that the thermal conductive properties are improved because the amount of the resin component existing between the aggregates becomes relatively large to improve the dispersibility of the aggregates to the resin component, so that the hBN powder and the resin component become well blended.

It is to be noted that the BET specific surface area of the hBN powder is measured by the BET one-point method utilizing the fluid process described in Examples.

The hBN powder according to the present invention has one maximum peak in a range of a particle size of 45 μm or more and 150 μm or less in a particle size distribution curve of the hBN powder classified to have a particle size of 45 μm or more and 106 μm or less, and has a decrease rate of the maximum peak of 10% or more and less than 40% when a dispersion liquid obtained by dispersing the hBN powder in water is subjected to an ultrasonic treatment for 1 minute, the decrease rate being calculated by the following expression (1):

Peak decrease rate=[(maximum peak height before treatment($a$))−(maximum peak height after treatment($b$))]/(maximum peak height before treatment($a$))  (1).

The particle size distribution curve is measured using a particle size distribution analyzer by the laser diffraction scattering method. The lower the peak decrease rate is, the higher the disintegration strength of the hBN powder is, and therefore the peak decrease rate is an index of the disintegration strength of the hBN powder. Accordingly, the disintegration of the aggregate in the process of forming a composite with a resin can be prevented or suppressed by setting the peak decrease rate to less than 40%. In addition, the insulation is improved by setting the peak decrease rate to 10% or more. Further, in the case where the hBN powder is used as a resin sheet obtained by molding a resin composition, the moldability is improved and the aggregate deforms moderately in the resin sheet by setting the peak decrease rate to 10% or more, and thereby the contact property of the hBN powder being a filler is improved to form a thermal conduction path, so that high thermal conduction properties can be exhibited. From these viewpoints, the peak decrease rate of the hBN powder is 10% or more and less than 40%, preferably 15% or more and 38% or less, more preferably 20% or more and 35% or less, still more preferably 23% or more and 30% or less, and further still more preferably 23% or more and 28% or less.

It is to be note that the peak decrease rate of the hBN powder is measured by the method described in Examples.

In addition, by the hBN powder "classified to have a diameter of 45 μm or more and 106 μm or less" in the present invention, a pre-treatment condition of the hBN powder according to the present invention provided for the measurement of the peak decrease rate is specified, but the hBN powder itself according to the present invention is not specified.

The crystallite size of the hBN powder according to the present invention is preferably 260 Å or more and 1000 Å or less, more preferably 280 Å or more and 750 Å or less, still more preferably 300 Å or more and 500 Å or less, and further still more preferably 320 Å or more and 400 Å or less from the viewpoint of improvements in the thermal conductive properties and of suppressing the anisotropy of the thermal conductivity. When the crystallite size is 260 Å or more, the inconsistency of the crystallites can be suppressed, so that high thermal conductive properties are exhibited. In addition, when the crystallite size is 1000 Å or less, the anisotropy of the thermal conductive properties can be suppressed.

It is to be noted that the crystallite size is measured by the method described in Examples.

The bulk density of the hBN powder according to the present invention is preferably 0.50 g/cm$^3$ or more, more preferably 0.60 g/cm$^3$ or more, still more preferably 0.70 g/cm$^3$, further still more preferably 0.75 g/cm$^3$ or more, and further still more preferably 0.80 g/cm$^3$ or more from the viewpoint of improvements in the strength of the aggregate.

It is to be noted that the bulk density of the hBN powder is measured by the method described in Examples.

The 50% volume cumulative particle size ($D_{50}$) of the hBN powder according to the present invention is preferably 10 μm or more and 150 μm or less, more preferably 15 μm or more and 100 μm or less, still more preferably 20 μm or more and 70 μm or less, further still more preferably 30 μm or more and 50 μm or less, and further still more preferably 35 μm or more and 45 μm or less from the viewpoint of improvements in the strength of the aggregate and in the filling rate.

It is to be noted that the 50% volume cumulative particle size ($D_{50}$) of the hBN powder is measured by the method described in Examples.

The hBN powder according to the present invention has a content of a powder not passing through a sieve having an opening of 45 μm determined using a reduced pressure suction type sieving machine (air jet sieve) of preferably 50% by mass or more, more preferably 60% by mass or more, still more preferably 70% by mass or more, further still more preferably 75% by mass or more, and further still more preferably 80% by mass or more from the viewpoint of improvements in the thermal conductive properties, and is preferably 90% by mass or less, more preferably 85% by mass or more from the viewpoint of easiness of production.

It is to be noted that the content of the powder not passing through the sieve having an opening of 45 μm is measured by the method described in Examples.

The hBN powder according to the present invention comprises the aggregate, and therefore the aggregate can maintain the granular shape without disintegrating and the orientation of the primary particles in a constant direction is prevented or suppressed even though the filling rate of the hBN powder in a resin composition is increased. Therefore, a resin composition and a resin sheet each having a suppressed anisotropy and having excellent thermal conductive properties can be obtained by using the hBN powder.

The purity of the hBN powder according to the present invention, namely the purity of hBN in the hBN powder according to the present invention is preferably 96% by mass or more, more preferably 98% by mass or more, still more preferably 99% by mass or more, further still more preferably 99.5% by mass or more, and further still more preferably 99.8% by mass or more from the viewpoint of improvements in the thermal conductive properties.

It is to be noted that the purity of the hBN powder can be measured by the method described in Examples.

The content of boron oxide (hereinafter, also simply referred to as "$B_2O_3$ content") in the hBN powder according to the present invention is preferably 0.001% by mass or more and 0.120% by mass or less, more preferably 0.005% by mass or more and 0.110% by mass or less, still more preferably 0.008% by mass or more and 0.100% by mass or less, further still more preferably 0.010% by mass or more and 0.080% by mass or less, and further still more preferably 0.020% by mass or more and 0.070% by mass or less from the viewpoint of improvements in the thermal conductive properties and production superiority.

It is to be noted that the $B_2O_3$ content can be measured by the method described in Examples.

The content of calcium oxide (hereinafter, also simply referred to as "CaO") in the hBN powder according to the present invention is preferably 0.50% by mass or less, more preferably 0.20% by mass or less, still more preferably 0.10% by mass or less, further still more preferably 0.05% by mass or less, further still more preferably 0.04% by mass or less, further still more preferably 0.03% by mass or less, and further still more preferably 0.02% by mass or less from the viewpoint of improvements in the thermal conductive properties.

It is to be noted that the content of CaO in the hBN powder can be measured by the method described in Examples.

The content of carbon in the hBN powder according to the present invention is preferably 0.50% by mass or less, more preferably 0.20% by mass or less, still more preferably 0.10% by mass or less, further still more preferably 0.05% by mass or less, further still more preferably 0.04% by mass or less, further still more preferably 0.03% by mass or less, and further still more preferably 0.02% by mass or less from the viewpoint of improvements in the thermal conductive properties and the electric insulation.

It is to be noted that the content of carbon in the hBN powder can be measured by the method described in Examples.

<Surface Treatment>

A surface treatment may be performed as necessary on the hBN powder according to the present invention using various coupling agents or the like for the purpose of enhancing the dispersibility in the resin component and improving the processability in producing a resin composition by dispersing the hBN powder according to the present invention in a resin component.

(Coupling Agent)

Examples of the coupling agent include silane-based, titanate-based, and aluminum-based coupling agents, and among these, silane-based coupling agents are preferable in terms of the effect. As the silane-based coupling agent, aminosilane compounds such as γ-aminopropyltrimethoxysilane, γ-aminopropyltriethoxysilane, γ-(2-aminoethyl)aminopropyltrimethoxysilane, γ-(2-aminoethyl)aminopropyltriethoxysilane, γ-anilinopropyltrimethoxysilane, γ-anilinopropyltriethoxysilane, N-β-(N-vinylbenzylamino-ethyl)-γ-aminopropyltrimethoxysilane, and N-β-(N-vinylbenzylaminoethyl)-γ-aminopropyltriethoxysilane are particularly preferably used.

[Method for Producing Hexagonal Boron Nitride Powder]

The hexagonal boron nitride powder (hBN powder) according to the present invention is preferably obtained by a production method comprising a step of mixing 100 parts by mass of a mixed powder comprising 50% by mass or more and 90% by mass or less of a boron nitride fine powder (A) (hereinafter, also simply referred to as "BN fine powder (A)") and 10% by mass or more and 50% by mass or less of an oxygen-containing boron compound (B) represented by a formula $(B_2O_3)(H_2O)_X$ wherein X=0 to 3 (hereinafter, also simply referred to as "boron compound (B)", and 1.0 part by mass or more and 15 parts by mass or less in terms of carbon of a carbon source (C), molding a resultant mixture, and then firing a resultant under an atmosphere comprising a nitrogen gas from the viewpoint of suppressing the anisotropy and the viewpoint of improvements in the thermal conductive properties.

It is to be noted that with respect to the hBN powder according to the present invention, the hBN powder is preferably obtained by further performing at least one of pulverization or classification after the firing step, and the hBN powder is more preferably obtained by performing both the pulverization and the classification.

Hereinafter, the boron nitride fine powder (BN fine powder) (A), the boron compound (B), and the carbon source (C) will be described, and subsequently each step of mixing, molding, firing, pulverization, and classification will be described.

<Mixed Powder>

The mixed powder for use in the production method according to the present invention comprises 50% by mass or more and 90% by mass or less of the BN fine powder (A) and 10% by mass or more and 50% by mass or less of the boron compound (B). The BN fine powder (A) has a ratio of an average longer diameter ($L_2$) to an average thickness ($d_2$) of primary particles thereof, $[L_2/d_2]$ (hereinafter, also simply referred to as "ratio $[L_2/d_2]$"), of 2.0 or more and 15 or less, a 50% volume cumulative particle size $D_{50}$ of 0.20 μm or more and 5.0 μm or less, a BET specific surface area of 5.0 m$^2$/g or more and 30 m$^2$/g or less, and a crystallite size of 150 Å or more and 400 Å or less.

When the BN fine powder (A) is contained, the BN particles densely exist in a molded body obtained from the BN fine powder (A), and therefore the particles grow in a state where the BN particles are entangled during firing, so that the hBN powder comprising a dense and strong aggregate can be obtained. Thereby, the anisotropy of the primary particles of hBN in the resin composition and the resin sheet described later can be suppressed, and the thermal conductive properties of the resin composition and the resin sheet can be improved.

The mixed powder is preferably obtained by mixing the BN fine powder (A) and the boron compound (B) so that the content of the BN fine powder (A) can be 50% by mass or more and 90% by mass or less and the content of the boron compound (B) can be 10% by mass or more and 50% by mass or less.

[Boron Nitride Fine Powder (A)]

The BN fine powder (A) has a hexagonal crystal structure, and the ratio $[L_2/d_2]$ in the primary particles of the BN fine powder (A) is 2.0 or more and 15 or less, preferably 5.0 or more and 10 or less, more preferably 5.0 or more and 8.0 or less, and still more preferably 5.0 or more and 7.0 or less from the viewpoint of suppressing the anisotropy of the primary particles of hBN in the resin composition and the resin sheet and the viewpoint of improvements in the thermal conductive properties of the resin composition and the resin sheet.

The 50% volume cumulative particle size $D_{50}$ of the BN fine powder (A) is 0.20 μm or more and 5.00 μm or less, preferably 0.20 μm or more and 4.00 μm or less, more preferably 0.20 μm or more and 3.00 μm or less, still more preferably 0.20 μm or more and 2.00 μm or less, further still more preferably 0.20 μm or more and 1.00 μm or less, further still more preferably 0.25 μm or more and 0.90 μm or less, and further still more preferably 0.30 μm or more and 0.80 μm or less from the viewpoint of suppressing the anisotropy of the primary particles of hBN in the resin composition and the resin sheet and the viewpoint of improvements in the thermal conductive properties of the resin composition and the resin sheet.

The BET specific surface area of the BN fine powder (A) is 5.0 m$^2$/g or more and 30 m$^2$/g or less, preferably 5.0 m$^2$/g or more and 25 m$^2$/g or less, more preferably 5.0 m$^2$/g or more and 20 m$^2$/g or less, still more preferably 6.0 m$^2$/g or more and 15 m$^2$/g or less, further still more preferably 6.0 m$^2$/g or more and 13 m$^2$/g or less, further still more preferably 7.0 m$^2$/g or more and 12 m$^2$/g or less, further still more preferably 8.0 m$^2$/g or more and 11 m$^2$/g or less, and further still more preferably 8.0 m$^2$/g or more and 10 m$^2$/g or less from the viewpoint of suppressing the anisotropy of the primary particles of hBN in the resin composition and the resin sheet and the viewpoint of improvements in the thermal conductive properties of the resin composition and the resin sheet.

The crystallite size of the BN fine powder (A) is 150 Å or more and 400 Å or less, preferably 180 Å or more and 400 Å or less, more preferably 200 Å or more and 400 Å or less, still more preferably 220 Å or more and 350 Å or less, further still more preferably 230 Å or more and 320 Å or less, and further still more preferably 240 Å or more and 300

Å or less from the viewpoint of suppressing the anisotropy of the primary particles of hBN in the resin composition and the resin sheet and the viewpoint of improvements in the thermal conductive properties of the resin composition and the resin sheet.

The purity of the BN fine powder (A) is preferably 95% by mass or more, more preferably 97% by mass or more, and still more preferably 99% by mass or more.

The content of the BN fine powder (A) in the mixed powder is 50% by mass or more and 90% by mass or less. When the content of the BN fine powder (A) in the mixed powder is 50% by mass or more, the hBN powder according to the present invention can be produced in a highly efficient manner by using the mixed powder as a raw material. When the content of the BN fine powder (A) is 90% by mass or less, production can be conducted efficiently while controlling the amount of the BN fine powder (A) to be used. From the viewpoints, the content of the BN fine powder (A) in the mixed powder is preferably 55% by mass or more, and more preferably 60% by mass or more, and is preferably 85% by mass or less, more preferably 80% by mass or less, still more preferably 75% by mass or less, and further still more preferably 70% by mass or less.

[Boron Compound (B)]

Examples of the boron compound (B) represented by the formula $(B_2O_3) \cdot (H_2O)_X$ wherein X=0 to 3 include at least one selected from the group consisting of oxides of boron including oxo acids of boron such as orthoboric acid ($H_3BO_3$), metaboric acid ($HBO_2$), and tetraboric acid ($H_2B_4O_7$), and boric anhydride ($B_2O_3$). Among others, boric anhydride ($B_2O_3$) is preferable from the viewpoint of an easy availability and a good miscibility with the BN fine powder (A).

The purity of the boron compound (B) is preferably 90% by mass or more, more preferably 95% by mass or ore, still more preferably 99% by mass or more, and further still more preferably 100% by mass.

The content of the boron compound (B) in the mixed powder is 10% by mass or more and 50% by mass or less. When the content of the boron compound (B) in the mixed powder is 10% by mass or more, production can be conducted efficiently while controlling the amount of the BN fine powder (A) to be used. When the content of the boron compound (B) is 50% by mass or less, the hBN powder according to the present invention can be produced in a highly efficient manner. From the viewpoints, the content of the boron compound (B) in the mixed powder is preferably 15% by mass or more, more preferably 20% by mass or more, still more preferably 25% by mass or more, and further still more preferably 30% by mass or more and is preferably 45% by mass or less, and more preferably 40% by mass or less.

It is to be noted that the total content of the BN fine powder (A) and the boron compound (B) in the mixed powder is preferably 90% by mass or more, more preferably 95% by mass or more, still more preferably 99% by mass or more, and further still more preferably 100% by mass.

The mixed powder may comprise another component within a range that does not impair the effects of the present invention, and the content of the another component in the mixed powder is preferably 10% by mass or less, more preferably 5% by mass or less, and still more preferably 1% by mass or less, and the mixed powder further still more preferably does not comprise the another component.

<Carbon Source (C)>

In the production method according to the present invention, 1.0 part by mass or more and 15 parts by mass or less in terms of carbon of the carbon source (C) is mixed, based on 100 parts by mass of the mixed powder.

The carbon source (C) for use in the production method according to the present invention is carbon or a carbon-containing compound. Examples of the carbon source (C) for use in the present invention include graphite, carbon black, boron carbide, saccharides, melamine, and phenol resins, and the carbon source is more preferably one or two selected from the group consisting of graphite and boron carbide. Moreover, graphite and boron carbide may be used together from the viewpoint of the strength of the aggregate and the viewpoint of reducing production cost.

The content of carbon in the carbon source (C) is preferably 90% by mass or more, more preferably 95% by mass or more, still more preferably 99% by mass or more, and further still more preferably 100% by mass.

In the case where the carbon source (C) is present at 1.0 part by mass or more in terms of carbon, the grain growth of the primary particles is facilitated, and nitriding the boron compound progresses to improve the crystallinity of the aggregate, and therefore the disintegration strength of the aggregate is improved. In the case where the carbon source (C) is present at 15 parts by mass or less in terms of carbon, an unreacted carbon component is prevented from being left as a foreign body, namely a black foreign body, to improve the degree of whiteness and the electric insulation.

From the viewpoints, the amount of the carbon source (C) to be blended based on 100 parts by mass of the mixed powder is preferably 1.0 parts by mass or more and 13 parts by mass or less, more preferably 2.0 parts by mass or more and 10 parts by mass or less, still more preferably 2.0 parts by mass or more and 8.0 parts by mass or less, and further still more preferably 2.5 parts by mass or more and 5.0 parts by mass or less in terms of carbon.

In the production method according to the present invention, the carbon source (C) includes preferably boron carbide (hereinafter, also simply referred to as "$B_4C$") from the viewpoint of the thermal conductive properties. The amount of boron carbide to be blended as the carbon source (C) based on 100 parts by mass of the mixed powder is preferably 1.0 part by mass or more and 15 parts by mass or less, more preferably 1.0 part by mass or more and 13 parts by mass or less, still more preferably 2.0 parts by mass or more and 10.0 parts by mass or less, further still more preferably 2.0 parts by mass or more and 8.0 parts by mass or less, and further still more preferably 2.5 parts by mass or more and 5.0 parts by mass or less in terms of carbon.

Thereby, the production of hBN progresses from carbon in the boron carbide crystal as a starting point to produce 4 mol of hBN from 1 mol of $B_4C$, facilitating the grain growth of the hBN primary particles in the thickness direction and also contributing to the production of the dense and strong aggregate, and therefore boron carbide is advantageous for the improvements in the thermal conductivity. Moreover, the granular shape can be maintained in the process of forming a composite with a resin and the disintegration of the aggregate can be prevented or suppressed.

In addition, in the case where graphite and boron carbide are used together as the carbon source (C), the firing time becomes short, and therefore the production cost can be reduced more, and the number of black foreign bodies due to boron carbide can be reduced more than in the case where boron carbide is used singly. Furthermore, the hBN powder comprising the denser and stronger aggregate in which the form of the boron carbide particles is maintained can be produced more than the hBN powder which is grown through dissolution and deposition from crystal cores produced at the surface of graphite when graphite is used singly as the carbon source (C).

The content of the boron carbide in the boron carbide is preferably 90% by mass or more, preferably 95% by mass or more, still more preferably 99% by mass or more, and further still more preferably 100% by mass.

In addition, the mass ratio of boron carbide to graphite (boron carbide/graphite) in the case where graphite and boron carbide are used together is preferably 5/95 to 50/50, more preferably 10/90 to 40/60, and still more preferably 20/80 to 35/65 in terms of carbon.

(Mixing)

The production method according to the present invention comprises a mixing step of mixing the BN fine powder (A) and the boron compound (B) to obtain a mixed powder firstly, and then mixing the mixed powder and the carbon source (C) to obtain a mixture. The method of mixing these is not particularly limited, and any of wet mixing and dry mixing may be used, but the wet mixing is preferable. The wet mixing can be performed using a general mixer such as a Henschel mixer, a ball mill, or a ribbon blender.

In addition, a binder may be added and mixed in the mixing. The binder is not particularly limited, examples thereof include resins such as polyvinyl alcohol (PVA), cellulose, and polyvinylidene fluoride (PVDF), and polyvinyl alcohol is preferably used.

The binder is preferably used as an aqueous binder solution obtained by dissolving these resins in water. The resin content in the aqueous binder solution is preferably 1% by mass or more and 15% by mass or less, more preferably 1% by mass or more and 10% by mass or less, and still more preferably 1% by mass or more and 5% by mass or less. The amount of the aqueous binder solution to be mixed, namely to be blended, based on 100 parts by mass of the mixed powder is preferably 1 part by mass or more and 20 parts by mass or less, more preferably 5 parts by mass or more and 15 parts by mass or less, and still more preferably 8 parts by mass or more and 12 parts by mass or less.

(Molding)

The production method according to the present invention comprises a step of subsequently molding the mixture obtained through the mixing into an appropriate shape to obtain a molded body. The shape is not particularly limited; however, a columnar shape such as a tablet is preferable from the viewpoint of ease of handling.

The molding is performed so that the density of the molded body can be preferably 0.50 g/cm$^3$ or more, more preferably 0.80 g/cm$^3$ or more, still more preferably 1.0 g/cm$^3$ or more and can be preferably 2.0 g/cm$^3$ or less, more preferably 1.8 g/cm$^3$ or less, and still more preferably 1.5 g/cm$^3$ or less from the viewpoint of improvements in the strength of the aggregate in which the primary particles of hBN aggregate, and of productivity, good handling, and reactivity.

It is to be noted that "the density of the molded body" means the density of the molded body before drying in the case where the mixing is the wet mixing, and in the case where a binder and water are used in the mixing, "the density of the molded body" means the density of the molded body including the binder and water.

(Firing)

The production method according to the present invention comprises a step of firing the molded body obtained through the molding. By subjecting the mixture to press molding to make the molded body and then firing the molded body, the boron compound (B) contained in the molded body reacts with carbon contained in the carbon source (C) to produce the hBN aggregate having a high disintegration strength, and the hBN powder according to the present invention is obtained. It is to be noted that in the case where the firing is performed without performing the molding, it is difficult to produce the hBN aggregate having a high disintegration strength sufficiently.

The atmosphere during the firing is an atmosphere comprising a nitrogen gas. The nitrogen gas concentration in the atmosphere comprising the nitrogen gas is preferably 60% by volume or more, more preferably 80% by volume or more, still more preferably 90% by volume or more, and further still more preferably 99% by volume or more. With respect to an oxygen gas, the less, the better.

The firing temperature is preferably 1000° C. or more and 2200° C. or less. When the firing temperature is 1000° C. or more, a sufficient reductive nitriding reaction progresses. In addition, when the firing temperature is 2200° C. or less, the occurrence of the decomposition of hBN is prevented. From the viewpoints, the firing temperature is more preferably 1500° C. or more and 2200° C. or less, still more preferably 1600° C. or more and 2200° C. or less, and further still more preferably 1700° C. or more and 2200° C. or less.

The firing time is preferably 1 hour or more and 20 hours or less. When the firing time is 1 hour or more, the reductive nitriding reaction progresses sufficiently, and an unreacted carbon component is prevented from being left as a black substance. In addition, when the firing time is 20 hours or less, firing cost is reduced. From this viewpoint, the firing time is more preferably 1 hour or more and 15 hours or less, still more preferably 3 hours or more and 10 hours or less, further still more preferably 4 hours or more and 9 hours or less, and further still more preferably 5 hours or more and 7 hours or less.

It is to be noted that drying may be performed before the firing. The drying temperature is preferably 150° C. or more and 400° C. or less, more preferably 200° C. or more and 400° C. or less, and the drying time is preferably 6 hours or more and 8 hours or less.

(Pulverization)

Subsequently, the fired product obtained through the firing is preferably pulverized.

The pulverization method is not particularly limited, and pulverization with a jaw crusher and coarse roll pulverization can be adopted.

(Classification)

Subsequently, the pulverized product obtained through the pulverization is preferably classified after the firing step.

The classification method is not particularly limited, and classification can be performed with a vibrating sieve apparatus or by air flow classification, water sieving, centrifugal separation, or the like. Among others, the classification is preferably performed with the vibrating sieve apparatus. Examples of the vibrating sieve apparatus include a dry type vibrating sieve apparatus [manufactured by KOEISANGYO Co., Ltd., trade name "SATO'S SYSTEM VIBRO SEPARATOR"].

The opening of the sieve for use in the classification can be selected appropriately according to the application of a thermally conductive member in which a resin composition comprising the hBN powder to be obtained is used.

In the case where the hBN powder according to the present invention is used in a resin sheet, the opening of the sieve can be selected appropriately according to the film thickness of the resin sheet and is preferably 50 μm or more and 150 μm or less, more preferably 60 μm or more and 130 μm or less, still more preferably 75 μm or 106 μm, further still more preferably 106 µm. In addition, the sieving time can be selected appropriately according to the opening of the sieve to be used and the amount to be charged in the apparatus, and in the case where a sieve having an opening of, for example, 106 µm is used, a powder is preferably made to pass through the sieve having an opening of 106 µm, the powder obtained through classification under a condition of a sieving time of 60 minutes.

The hBN powder according to the present invention is preferably obtained by the production method further performing at least one of pulverization or classification after the firing step, and comprises the hBN powder having a particle size of 45 µm or more and 106 µm or less.

(Mixing of hBN Powder)

Further, after the calcined product obtained through the calcination is pulverized, the method for producing the hBN powder according to the present invention preferably comprises a step of classifying the fired product, which is pulverized, using a sieve having an opening of 106 µm, a sieve having an opening of 45 µm, and a vibrating sieve apparatus into the hBN powder of 45 to 106 µm (hereinafter, also referred to as "hBN powder ($\alpha$)" and the hBN powder passing through the sieve of 45 µm (hereinafter, also referred to as "hBN powder ($\beta$)" and then mixing the hBN powder ($\alpha$) and the hBN powder ($\beta$) so that the ratio of the hBN powder ($\alpha$) to the total mass of the hBN powders ($\alpha$) and ($\beta$) (hereinafter, also referred to as granule rate (%)=[$\alpha$/[($\alpha$)+($\beta$)]]) can be 40% by mass or more and 95% by mass or less, from the viewpoint of suppressing the anisotropy and the viewpoint of improvements in the thermal conductive properties. The mixing method is not particularly limited, and any of wet mixing and dry mixing may be used, but the dry mixing is preferable. The dry mixing can be performed using a general mixer such as a Henschel mixer, a ball mill, a ribbon blender, or a V-type blender, but the V-type blender is preferable from the viewpoint of mixing the hBN powder uniformly. The mixing time is preferably 20 to 90 minutes, more preferably 50 to 70 minutes.

The granule rate is more preferably 50% by mass or more and 95% by mass or less, still more preferably 60% by mass or more and 90% by mass or less, and further still more preferably 70% by mass or more and 85% by mass or less from the viewpoint of suppressing the anisotropy and the viewpoint of improvements in the thermal conductive properties.

[Classified Hexagonal Boron Nitride Powder]

In the case of a thin-film resin sheet having a film thickness of 110 µm or less, the resin sheet obtained by molding the resin composition comprising the hexagonal boron nitride powder (hBN powder), the hBN powder is preferably further classified into the classified hexagonal boron nitride powder (hereinafter, also simply referred to as "classified hBN powder"). The classification method is not particularly limited, and the classification can be performed with the vibrating sieve apparatus or by the air flow classification, the water sieving, the centrifugal separation, or the like in the same manner as the hBN powder. Among others, the classification is preferably performed with the vibrating sieve apparatus. Examples of the vibrating sieve apparatus include the dry type vibrating sieve apparatus [manufactured by KOEISANGYO Co., Ltd., trade name "SATO'S SYSTEM VIBRO SEPARATOR"].

The opening of the sieve for use in the classification can be selected appropriately according to the film thickness of a thin-film resin sheet obtained by molding a resin composition comprising the hBN powder to be obtained and is preferably 20 µm or more and less than 50 µm, more preferably 30 µm or more and less than 50 µm, and still more preferably 45 µm.

[Resin Composition]

The resin composition according to the present invention comprises 10% by volume or more and 90% by volume or less of the hexagonal boron nitride powder (hBN powder) as a filler. The content of the hBN powder in the resin composition according to the present invention is 10% by volume or more and 90% by volume or less, preferably 20% by volume or more and 80% by volume or less, more preferably 30% by volume or more and 70% by volume or less, still more preferably 35% by volume or more and 65% by volume or less, and further still more preferably 40% by volume or more and 60% by volume or less from the viewpoint of ease of production in the process of forming a composite with a resin and improvements in the thermal conductive properties.

By using the hBN powder, the aggregate can maintain the granular shape without disintegrating in the process of forming a composite with a resin in producing the resin composition, and therefore the filling rate in the resin composition can be improved, and as a result, the high thermal conductive properties can be exhibited. Further the hBN powder comprises a strong aggregate, and therefore the anisotropy due to the disintegration of the aggregate can be suppressed.

In the present invention, the content based on volume (% by volume) of the hBN powder can be determined from the specific gravity of the hBN powder and the specific gravities of various resins for use as an organic matrix.

In addition, in the case where the resin sheet is a thin-film resin sheet having a film thickness of 110 µm or less as described below, the classified hBN powder obtained by further classifying the hBN powder with the vibrating sieve apparatus or the like is preferably used in the resin composition according to the present invention. The content of the classified hBN powder (% by volume) in the resin composition according to the present invention is the same as the content of the hBN powder.

<Organic Matrix>

The resin composition according to the present invention comprises a resin as an organic matrix.

The resin for use in the present invention preferably comprises at least one resin selected from the group consisting of thermosetting resins, thermoplastic resins, various kinds of rubber, thermoplastic elastomers, oil, and the like.

Examples of the thermosetting resins include epoxy resins, silicone resins, phenol resins, urea resins, unsaturated polyester resins, melamine resins, polyimide resins, polybenzoxazole resins, and urethane resins.

Examples of the thermoplastic resins include: polyolefin resins such as polyethylene, polypropylene, and ethylene-vinyl acetate copolymers; polyester resins such as polyethylene terephthalate, polybutylene terephthalate, and liquid crystal polyesters; and polyvinyl chloride resins, acrylic resins, polyphenylene sulfide resins, polyphenylene ether resins, polyamide resins, polyamideimide resins, and polycarbonate resins.

Examples of the various kinds of rubber include natural rubber, polyisoprene rubber, styrene-butadiene copolymer rubber, polybutadiene rubber, ethylene-propylene copolymers, ethylene-propylene-diene copolymers, butadiene-acrylonitrile copolymers, isobutylene-isoprene copolymers, chloroprene rubber, silicone rubber, fluororubber, chlorosulfonated polyethylenes, and polyurethane rubber. These kinds of rubber are preferably crosslinked and used.

Examples of the thermoplastic elastomers include olefin-based thermoplastic elastomers, styrene-based thermoplastic elastomers, vinyl chloride-based thermoplastic elastomers, urethane-based thermoplastic elastomers, and ester-based thermoplastic elastomers.

Examples of the oil component include grease such as silicone oil.

The organic matrices may be used singly or in a combination or two or more.

The resin for use as the organic matrix can be selected appropriately according to the application of a thermally conductive member obtained using the resin composition according to the present invention and demand characteristics such as the mechanical strength, heat resistance, durability, softness, and flexibility of the thermally conductive member.

Among these, at least one resin selected from the group consisting of various thermosetting resins, thermoplastic resins, rubber, and thermoplastic elastomers, and the like which are used as the organic matrix of the conventional resin sheets, more preferably thermosetting resins, and still more preferably curable epoxy resins and curable silicone resins from the viewpoint of suppressing the anisotropy and the viewpoint of improvements in the thermal conductive properties.

The content of the organic matrix in the resin composition is preferably 10% by volume or more and 90% by volume or less, more preferably 20% by volume or more and 80% by volume or less, still more preferably 30% by volume or more and 70% by volume or less, further still more preferably 35% by volume or more and 65% by volume or less, and further still more preferably 40% by volume or more and 60% by volume or less from the viewpoint of the ease of production in the process of forming a composite with a resin and the thermal conductive properties.

In the present invention, the content based on volume (% by volume) of the organic matrix can be determined from the specific gravity of the hBN powder and specific gravities of various resins for use as the organic matrix.

[Curable Epoxy Resin]

In the resin composition according to the present invention, as the curable epoxy resin for use as the organic matrix, epoxy resins which are in a liquid form at normal temperature (namely, 25° C.) and low softening point epoxy resins which are in a solid form at normal temperature (namely, 25° C.) are preferable from the viewpoint of dispersibility of the hBN powder to the organic matrix.

The curable epoxy resin is not particularly limited as long as the curable epoxy resin is a compound having two or more epoxy groups in one molecule, and any of the publicly known compounds which have been used conventionally as the epoxy resin can be selected and used appropriately. Examples of such an epoxy resin include bisphenol A type epoxy resins, bisphenol F type epoxy resins, glycidyl ethers of a polycarboxylic acid, and epoxy resins obtained through epoxidation of a cyclohexane derivative. These may be used singly or in a combination of two or more. Among the epoxy resins, bisphenol A type epoxy resins, bisphenol F type epoxy resins, and epoxy resins obtained through epoxidation of a cyclohexane derivative are suitable from the viewpoint of the heat resistance, workability, and the like.

(Curing Agent for Epoxy Resin)

A curing agent for epoxy resins is usually used for curing the curable epoxy resin. The curing agent for epoxy resins is not particularly limited, any of the curing agents which have been used conventionally as the curing agent for epoxy resins can be selected and used appropriately, and examples thereof include amine-based, phenol-based, acid anhydride-based and imidazole-based curing agents. Examples of the amine-based curing agents preferably include dicyandiamide and aromatic diamines such as m-phenylenediamine, 4,4'-diaminodiphenylmethane, 4,4'-diaminodiphenylsulfone, and m-xylylenediamine. Examples of the phenol-based curing agents preferably include phenol novolac resins, cresol novolac resins, bisphenol A type novolac resins, and triazine-modified phenol novolac resins. In addition, examples of the acid anhydride-based curing agents include alicyclic acid anhydrides such as methylhexahydrophthalic anhydride, aromatic acid anhydrides such as phthalic anhydride, aliphatic acid anhydrides such as aliphatic dibasic acid anhydrides, and halogen-based acid anhydrides such as chlorendic anhydride. Examples of the imidazole-based curing agents include 2-methylimidazole, 2-undecylimidazole, 2-heptadecylimidazole, 2-ethyl-4-methylimidazole, 2-phenylimidazole, 2-phenyl-4-methylimidazole, and 1-cyanoethyl-2-ethyl-4-methylimidazole.

These curing agents may be used singly or in a combination of two or more. The amount of the curing agent for epoxy resins to be used is usually selected in a range of an equivalent ratio of about 0.5 to about 1.5, preferably in a range of an equivalent ratio of 0.7 to 1.3 in terms of the equivalent ratio of the curing agent to the curable epoxy resin from the viewpoint of curability, a balance among physical properties of a cured resin, and the like.

(Curing Accelerator for Epoxy Resins)

In the resin composition according to the present invention, a curing accelerator for epoxy resins can be used as necessary together with the curing agent for epoxy resins.

The curing accelerator for epoxy resins is not particularly limited, any of the curing accelerators which have been used conventionally as the curing accelerator for epoxy resins can be selected and used appropriately. Examples include imidazole compounds such as 2-ethyl-4-methylimidazole, 1-benzyl-2-methylimidazole, 2-methylimidazole, 2-ethylimidazole, 2-isopropylimidazole, 2-phenylimidazole, and 2-phenyl-4-methylimidazole, 2,4,6-tris(dimethylaminomethyl)phenol, boron trifluoride-amine complexes, and triphenylphosphine. These curing accelerators may be used singly or in a combination of two or more. The amount of the curing accelerator for epoxy resins to be used is usually selected in a range of about 0.1 to about 10 parts by mass, preferably in a range of 0.4 to 5 parts by mass based on 100 parts by mass of the curable epoxy resin from the viewpoint of curing acceleration properties, the balance among physical properties of the cured resin, and the like.

[Curable Silicone Resin]

As the curable silicone resin, a mixture of an addition reaction type silicone resin and a silicone-based crosslinking agent can be used. Examples of the addition reaction type silicone resin include at least one selected from the group consisting of polyorganosiloxanes comprising an alkenyl group as a functional group in the molecule. Preferred examples of the polyorganosiloxanes comprising an alkenyl group as a functional group in the molecule include a polydimethylsiloxane comprising a vinyl group as a functional group, a polydimethylsiloxane comprising a hexenyl group as a functional group, and a mixture thereof.

Examples of the silicone-based crosslinking agent include polyorganosiloxanes comprising at least 2 silicon atom-bonded hydrogen atoms in one molecule, specifically, dimethylsiloxane-methylhydrogensiloxane copolymers end-capped with a dimethylhydrogensiloxy group, dimethylsiloxane-methylhydrogensiloxane copolymers end-capped with a trimethylsiloxy group, poly(methylhydrogensiloxane) end-capped with a trimethylsiloxane group, and poly(hydrogen silsesquioxane).

In addition, as a curing catalyst, a platinum-based compound is usually used. Examples of the platinum-based compound include particulate platinum, particulate platinum adsorbed on a carbon powder carrier, chloroplatinic acid, alcohol-modified chloroplatinic acid, olefin complexes of chloroplatinic acid, palladium, and rhodium catalysts.

The resin composition according to the present invention may further comprise another component in a range where the effects of the present invention are obtained. Examples of such a component include a particle of a nitride such as aluminum nitride, silicon nitride, and fibrous boron nitride, electrically insulating metal oxides such as alumina, fibrous alumina, zinc oxide, magnesium oxide, beryllium oxide, and titanium oxide, electrically insulating carbon components such as diamond and fullerene, a plasticizing agent, an adhesive, a reinforcing agent, a coloring agent, a heat resistance improver, a viscosity modifier, a dispersion stabilizer, and a solvent.

Moreover, in the resin composition according to the present invention, an inorganic filler such as aluminum hydroxide or magnesium hydroxide, a surface treating agent such as a silane coupling agent which improves the adhesion strength at an interface between the inorganic filler and the resin, a reducing agent, or the like may be added in addition to the materials each listed as an example of the nitride particle and the electrically insulating metal oxide as long as the effects of the present invention are not impaired.

The resin composition according to the present invention can be produced, for example, in the manner as described below.

The organic matrix is first prepared by mixing the resin, and the curing agent and the solvent as necessary.

Subsequently, the hBN powder is added to the organic matrix so that the hBN powder can be contained in a proportion of 10% by volume or more and 90% by volume or less in the total amount of the hBN powder and the organic matrix. The weight of the hBN powder and of the resin are each set according to the specific gravity of the hBN powder and the specific gravity of the resin to be used as the organic matrix so that a desired % by volume of the hBN powder and of the resin can be contained, and the hBN powder and the resin are weighed and then mixed to prepare the resin composition.

In the case where the curable epoxy resin is used as a main component of the organic matrix in the resin composition according to the present invention, a mixture of the curable epoxy resin, the curing agent for epoxy resins, and the curing accelerator for epoxy resins which is used as necessary forms the organic matrix. In addition, in the case where the curable silicone resin is used as a main component of the organic matrix, a mixture of the addition reaction type silicone resin, the silicone-based crosslinking agent, and the curing catalyst forms the organic matrix.

The resin composition which is obtained in this way can be used for a thermally conductive member such as a thermally conductive sheet, thermally conductive gel, thermally conductive grease, a thermally conductive adhesive, or a phase change sheet. As a result, the heat from a heat generating electronic component such as an MPU, a power transistor, or a transformer can be transferred efficiently to a heat dissipation component such as a heat dissipation fin or a heat dissipation fan.

Among the thermally conductive members, the resin composition is preferably used as a thermally conductive sheet and for a resin sheet. By using the resin composition for a resin sheet, the effects of the resin composition can be particularly exhibited from the viewpoint of suppressing the anisotropy and the viewpoint of improvements in the thermal conductive properties.

[Resin Sheet]

The resin sheet according to the present invention comprises the resin composition or a cured product thereof and is obtained by molding the resin composition into a sheet. In the case where the resin composition is curable, the resin sheet according to the present invention is obtained by molding the resin composition into a sheet and then curing the molded resin composition.

The resin sheet according to the present invention can be produced by applying the resin composition on a base material, such as a releasable film including a resin film with a release layer, or the like, with a usual coating machine or the like, and, in the case where the resin composition comprises a solvent, then drying the solvent with a far infrared ray radiation heater, or by hot air blowing or the like to form a sheet.

As the release layer, a melamine resin or the like is used. In addition, as the resin film, a polyester resin or the like such as polyethylene terephthalate is used.

In the case where the organic matrix in the resin composition is not a curable organic matrix such as the curable epoxy resin or the curable silicone resin, the resin sheet per se which is formed into a sheet is the resin sheet according to the present invention.

Further, in the case where the organic matrix is a curable matrix, the resin sheet which is obtained above and formed on the base material is pressurized as necessary through the base material from a side of a surface of the base material, the surface not coated with the resin composition, and is then further subjected to a heat treatment to be cured to obtain the resin sheet according to the present invention. The pressurization condition is preferably 15 MPa or more and 20 MPa or less, more preferably 17 MPa or more and 19 MPa or less. In addition, the heat condition is preferably 80° C. or more and 200° C. or less, more preferably 100° C. or more and 150° C. or less. It is to be noted that the base material for the releasable film and the like is usually peeled or removed finally.

The film thickness of the resin sheet according to the present invention which is obtained in this way is preferably 50 μm or more and 10 mm or less, more preferably 50 μm or more and 1.0 mm or less, still more preferably 50 μm or more and 500 μm or less, further still more preferably 60 μm or more and 400 μm or less, and further still more preferably 70 μm or more and 300 μm or less from the viewpoint of moldability. Moreover, the film thickness of the resin sheet according to the present invention is preferably in a range of 50 μm or more and 150 μm or less, more preferably 60 μm or more and 130 μm or less, and still more preferably 70 μm or more and 110 μm or less from the viewpoint of reducing the weight and thickness of electronic components and the like for which the resin sheet is used.

In the case where the resin sheet is a thin-film resin sheet having a film thickness of 110 μm or less, the resin composition comprising the classified hBN powder obtained by further classifying the hBN powder with the vibrating sieve apparatus or the like is preferably molded.

The resin sheet according to the present invention has a thermal conductivity in the thickness direction of preferably 5.0 W/m·K or more, more preferably 10 W/m·K or more, still more preferably 15 W/m·K or more, further still more preferably 18 W/m·K or more, further still more preferably 20 W/m·K, further still more preferably 22 W/m·K or more, further still more preferably 24 W/m·K or more, and further still more preferably 25 W/m·K or more.

Moreover, the resin sheet according to the present invention preferably has a degree of orientation of the primary particles of hBN of 25 or less, more preferably 23 or less, still more preferably 20 or less, further still more preferably 18 or less, further still more preferably 17 or less, further still more preferably 16 or less, and further still more preferably 15 or less.

The resin sheet according to the present invention has a specific gravity rate of preferably 90% or more and 100% or less, more preferably 95% or more and 100% or less, and still more preferably 98% or more and 100% or less, and further still more preferably 100% from the viewpoint of the electric insulation.

The resin sheet according to the present invention may be used by laminating or embedding a member in a sheet form, a fiber form, or a net-like appearance on one surface or both surfaces thereof, or in the sheet, for improving workability or reinforcement.

The resin sheet thus obtained can be made to be a product form for use as a resin sheet in a state where the obtained resin sheet is peeled from the releasable film or in a state where the releasable film is used as a protective film.

Moreover, the resin sheet according to the present invention may have a configuration in which an adhesive layer is further provided on the upper surface or the lower surface of the resin sheet, thereby enhancing convenience during the use of a product.

The resin sheet according to the present invention is used, for example, as a thermally conductive sheet with which the heat from a heat generating electronic component such as an MPU, a power transistor, or a transformer is transferred to a heat dissipation component such as a heat dissipation fin or a heat dissipation fan, and is used by being interposed between the heat generating electronic component and the heat dissipation component. Thereby, the heat transfer between the heat generating electronic component and the heat dissipation component becomes good and malfunction of the heat generating electronic component can be reduced remarkably.

EXAMPLES

Hereinafter, the present invention will be described further specifically giving Examples and Comparative Examples, but the present invention in not limited by these examples.

Example 1

(1) Preparation of Mixed Powder

As the BN fine powder (A), 65 parts by mass of a BN fine powder (A-1) having the following properties and 35 parts of boron oxide ($B_2O_3$, boric anhydride) manufactured by KANTO CHEMICAL CO., INC. as the boron compound (B) were mixed using a mixer to obtain a mixed powder (X1) having a content of the BN fine powder (A) of 65% by mass and a content of the boron compound (B) of 35% by mass.

BN fine powder (A-1): ratio $[L_2/d_2]$ 6.0, $D_{50}$ 0.67 μm, BET specific surface area 9.9 m$^2$/g, crystallite size 262 Å

(2) Preparation of hBN Powder

As the carbon source (C), 3.3 parts by mass of boron carbide ($B_4C$) manufactured by RIKEN CORUNDUM CO., LTD. and 10 parts by mass of an aqueous PVA solution (concentration of 2.5% by mass) were added based on 100 parts by mass of the mixed power (X1) to obtain a mixture having a content of the carbon source (C) in terms of carbon of 3.3 parts by mass based on 100 parts by mass of the mixed powder. The mixture was stirred and mixed with a mixer, thereafter put into a metal mold, and then pressurized to obtain a tablet-like molded body having a density of 1.4 g/cm$^3$. The molded body was dried in a dryer at 300° C. for 6 hours to obtain a dried product. The dried product was fired in a high-frequency furnace at 1750° C. to 2200° C. under a nitrogen gas atmosphere for 6 hours in total to obtain an hBN fired product.

The obtained hBN fired product was pulverized using a jaw crusher and a pin mill and was then classified using the dry type vibrating sieve apparatus [manufactured by KOEI-SANGYO Co., Ltd., trade name "SATO'S SYSTEM VIBRO SEPARATOR"] with a sieve having an opening of 106 μm and a sieve having an opening of 45 μm under a condition of a sieving time of 60 minutes into the hBN powder (α) of 45 to 106 μm and the hBN powder (β) passing through the sieve of 45 μm, and the powder of exceeding 106 μm was removed.

The hBN powder (α) and the hBN powder (β) were mixed so that the granule rate was 80% by mass to obtain an hBN powder according to Example 1.

It is to be noted that the granule rate is expressed by the following expression, namely, by the ratio of the hBN powder (α) to the total mass of the hBN powder (α) of 45 to 106 μm and the hBN powder (β) passing through the sieve of 45 μm.

Granule rate (%)=[(α)/[(α)+(β)]]

When the obtained hBN powder was observed with an SEM, it was ascertained that the hBN powder comprises an hBN aggregate in which each primary particle faces in a random direction as shown in FIG. 2 and FIG. 3. It is to be noted that FIG. 1 is a schematic diagram of the hBN aggregate existing in FIG. 2 and in FIG. 3.

(3) Preparation of Resin Composition

Firstly, 100 parts by mass of a curable liquid epoxy resin [manufactured by Japan Epoxy Resin, trade name "jER 828", bisphenol A type, epoxy equivalence of 184 to 194 g/eq] and 5 parts by mass of 1-cyanoethyl-2-ethyl-4-methylimidazole [manufactured by SHIKOKU CHEMICALS CORPORATION, trade name "2E4MZ-CN"] as a curing agent were mixed to prepare an organic matrix.

Subsequently, the hBN powder obtained above was added thereto based on 100 parts by mass of the organic matrix described above so that the hBN powder content in the total amount of the hBN powder and the organic matrix was 60% by volume, and the resultant mixture was stirred and mixed using MAZERUSTAR® manufactured by KURABO INDUSTRIES LTD. to prepare a resin composition.

It is to be noted that the content based on volume (% by volume) of the hBN powder was determined from the specific gravity of the hBN powder (2.27) and the specific gravity of the curable liquid epoxy resin (1.17) used as the organic matrix.

(4) Preparation of Resin Sheet

Molding was performed using the resin composition obtained above and a metallic mold on a releasable film cut to 10.5 cm wide and 13 cm length so that the cured film thickness was 500 μm or less. Thereafter, the molded resin composition was interposed between releasable films, and then crimping was performed on the molded resin composition through the releasable films with a metallic mold under conditions of 120° C. and 18 MPa for 10 minutes to cure the resin composition, thereby preparing a resin sheet.

Example 2

An hBN powder, a resin composition, and a resin sheet were each prepared in the same manner as in Example 1 except that 5.0 parts by mass of artificial graphite fine powder "UF-G30" manufactured by Showa Denko K.K. and 2.0 parts by mass of the boron carbide based on 100 parts by mass of the mixed powder (X1) were used as the carbon source (C) in Example 1 (2).

Example 3

An hBN powder, a resin composition, and a resin sheet were each prepared in the same manner as in Example 1 except that 2.2 parts by mass of the boron carbide based on 100 parts by mass of the mixed powder (X1) was used as the carbon source (C) in Example 1 (2).

Example 4

An hBN powder, a resin composition, and a resin sheet were each prepared in the same manner as in Example 1 except that 10 parts by mass of the artificial graphite fine powder based on 100 parts by mass of the mixed powder (X1) was used as the carbon source (C) in Example 1 (2).

Example 5

(1) Preparation of Mixed Powder

As the BN fine powder (A), 80 parts by mass of a BN fine powder (A-1) and 20 parts by mass of the boron oxide ($B_2O_3$, boric anhydride) as the boron compound (B) were mixed using a mixer to obtain a mixed powder (X2) having a content of the BN fine powder (A) of 80% by mass and a content of the boron compound (B) of 20% by mass.

(2) Preparation of hBN Powder, Resin Composition, and Resin Sheet

An hBN powder, a resin composition, and a resin sheet were each prepared in the same manner as in Example 1 (2) to (4) except that the mixed powder (X2) was used in place of the mixed powder (X1), and 1.6 parts by mass of the boron carbide based on 100 parts by mass of the mixed powder (X2) was used as the carbon source (C) in Example 1 (2).

Example 6

(1) Preparation of Mixed Powder

As the BN fine powder (A), 65 parts by mass of a BN fine powder (A-2) having the following properties and 35 parts by mass of the boron oxide ($B_2O_3$, boric anhydride) as the boron compound (B) were mixed using a mixer to obtain a mixed powder (X4) having a content of the BN fine powder (A) of 65% by mass and a content of the boron oxide (B) of 35% by mass.

BN fine powder (A-2): ratio $[L_2/d_2]$ 8.0, $D_{50}$ 4.50 μm, BET specific surface area 11.7 $m^2/g$, crystallite size 203 Å

(2) Preparation of hBN Powder, Resin Composition, and Resin Sheet

An hBN powder, a resin composition, and a resin sheet were each prepared in the same manner as in Example 1 (2) to (4) except that the mixed powder (X4) was used in place of the mixed powder (X1), and 3.3 parts by mass of the boron carbide based on 100 parts by mass of the mixed powder (X4) was used as the carbon source (C) in Example 1 (2).

Example 7

(1) Preparation of Mixed Powder

As the BN fine powder (A), 65 parts by mass of a BN fine powder (A-3) having the following properties and 35 parts by mass of the boron oxide ($B_2O_3$, boric anhydride) as the boron compound (B) were mixed using a mixer to obtain a mixed powder (X5) having a content of the BN fine powder (A) of 65% by mass and a content of the boron oxide (B) of 35% by mass.

BN fine powder (A-3): ratio $[L_2/d_2]$ 7.5, $D_{50}$ 0.40 μm, BET specific surface area 26.0 $m^2/g$, crystallite size 161 Å

(2) Preparation of hBN Powder, Resin Composition, and Resin Sheet

An hBN powder, a resin composition, and a resin sheet were each prepared in the same manner as in Example 1 (2) to (4) except that the mixed powder (X5) was used in place of the mixed powder (X1), and 3.3 parts by mass of the boron carbide based on 100 parts by mass of the mixed powder (X5) was used as the carbon source (C) in Example 1 (2).

Comparative Example 1

A resin composition and a resin sheet were each prepared in the same manner as in Example 1 except that an hBN powder was prepared in the manner as described below in place of Example 1 (1) and (2).

(1-1) Preparation of Crude hBN Powder

A mixture obtained by adding 4 g of boric acid, 2 g of melamine, and 1 g of water was stirred and mixed, and the resultant mixture was put into a metal mold and then pressurized to obtain a molded body having a density of 0.7 $g/cm^3$. A dried product obtained by drying the molded body in a dryer at 300° C. for 100 minutes was calcined at 1100° C. under an $NH_3$ gas atmosphere for 120 minutes. The calcined product thus obtained (crude hBN) was pulverized to obtain a crude hBN powder (content of boron oxide of 35% by mass).

(2-1) Preparation of hBN Powder

As the carbon source, 10 parts by mass of the graphite fine powder "UF-G30", 0.4 parts by mass of calcium carbonate as the Ca compound, and 10 parts by mass of an aqueous PVA solution (concentration of 2.5% by mass) were added based on 100 parts by mass of the crude hBN powder to obtain a mixture having a content of the carbon source in terms of carbon of 10 parts by mass based on 100 parts by mass of the crude hBN powder. The mixture was stirred and mixed with a mixer, thereafter put into a metal mold, and then pressurized to obtain a molded body having a density of 1.2 $g/cm^3$. The molded body was dried in a dryer at 300° C. for 6 hours to obtain a dried product. The dried product was fired in a high-frequency furnace at 1750° C. to 2200° C. under a nitrogen gas atmosphere for 6 hours in total to obtain an hBN fired product.

The obtained hBN fired product was pulverized using a jaw crusher and a pin mill and was then classified using the dry type vibrating sieve apparatus [manufactured by KOEI-SANGYO Co., Ltd., trade name "SATO'S SYSTEM VIBRO SEPARATOR"] with a sieve having an opening of 106 μm and a sieve having an opening of 45 μm under a condition of a sieving time of 60 minutes into the hBN powder (α) of 45 to 106 μm and the hBN powder (β) passing through the sieve of 45 μm.

The hBN powder (α) and the hBN powder (β) were mixed so that the granule rate was 80% by mass to obtain an hBN powder according to Comparative Example 1.

It is to be noted that the granule rate is expressed by the following expression, namely, by the ratio of the hBN powder (α) to the total mass of the hBN powder (α) of 45 to 106 μm and the hBN powder (β) passing through the sieve of 45 μm.

Granule rate (%)=[(α)/[(α)+(β)]]

Comparative Example 2

A resin composition and a resin sheet were each prepared in the same manner as in Example 1 except that an hBN powder "UHP-EX" manufactured by Showa Denko K.K. was used in place of the hBN powder obtained in Example 1 (1) and (2).

Comparative Example 3

An hBN powder, a resin composition, and a resin sheet were each prepared in the same manner as in Example 1 except that a mixed powder (XC-1) was made using the BN fine powder (AC-1) described below in place of the BN fine powder (A-1) in Example 1 (1).
BN fine powder (AC-1): ratio $[L_2/d_2]$ 22.0, $D_{50}$ 9.90 μm, BET specific surface area 17.6 m²/g, crystallite size 197 Å, Comparative Example 4

(1) Preparation of Mixed Powder
As the BN fine powder (A), 45 parts by mass of the BN fine powder (A-1), 55 parts by mass of the boron oxide ($B_2O_3$, boric anhydride) as the boron compound (B) were mixed using a mixer to obtain a mixed powder (X3) having a content of the BN fine powder (A) of 45% by mass and a content of the boron compound (B) of 55% by mass.
(2) Preparation of hBN Powder, Resin Composition, and Resin Sheet
An hBN powder, a resin composition, and a resin sheet were each prepared in the same manner as in Example 1 (2) to (4) except that the mixed powder (X3) was used in place of the mixed powder (X1), and 2.2 parts by mass of the boron carbide based on 100 parts by mass of the mixed powder (X3) was used as the carbon source (C) in Example 1 (2).
[Evaluation]
The following evaluations were conducted for the BN fine powders, the hBN powders, the resin compositions, and the resin sheets. The evaluation results are shown in Table 2.
(Diameter of Primary Particles of hBN Powder)
An SEM photograph was taken for the hBN powder obtained in each of Examples and Comparative Examples, and the longer diameters were measured for 100 hBN primary particles arbitrarily selected from the primary particles in the SEM photograph, and the number average value of the longer diameters was determined as the diameter of the primary particles of the hBN powder.
(Ratio $[L_2/d_2]$ of BN Fine Powder and Ratio $[L_1/d_1]$ of hBN Powder)
An SEM photograph was taken for the BN fine powder used in each of Examples and Comparative Examples and for the hBN powder obtained in each of Examples and Comparative Examples, and the longer diameters and the shorter diameters were measured for 100 primary particles arbitrarily selected from the primary particles in the SEM photograph. The number average value of the longer diameters was determined as the average longer diameter ($L_2$) or average longer diameter ($L_1$) of the primary particles, and the number average value of the thicknesses was determined as the average thickness ($d_2$) or average thickness ($d_1$) of the primary particles to calculate the ratio of the average longer diameter to the average thickness of the primary particles, $[L_2/d_2]$ and $[L1/d_1]$.
(BET Specific Surface Area of BN Fine Powder and of hBN Powder)
The BET specific surface area was measured for the BN fine powders used in Examples and Comparative Examples and the hBN powders obtained in Examples and Comparative Examples by the BET one-point method utilizing the fluid process using a full-automatic BET specific surface area measuring apparatus [manufactured by Yuasa Ionics Inc., model name "Multisorb 16"].
(Peak Decrease Rate)
In the present invention, the measurement of the peak decrease rate was conducted using a particle size distribution analyzer [manufactured by NIKKISO CO., LTD., model name "Microtrac MT3300EX II"] of the laser diffraction scattering method.
A dispersion liquid was prepared in such a way that the hBN powder of each of Examples and Comparative Examples was classified with the dry type vibrating sieve apparatus (sieving time of 60 minutes) using a sieve having an opening of 106 μm and a sieve having an opening of 45 μm with the two sieves piled up, and 0.06 g of the classified hBN powder having a particle size of 45 μm or more and 106 μm or less was then dispersed in 50 g of water. The dispersion liquid was placed in a 50-ml container and was then subjected to an ultrasonic treatment for 1 minute under conditions of an output of 150 W and an oscillating frequency of 19.5 kHz, and thereafter the measurement of the particle size distribution was conducted while stirring the dispersion liquid using a magnetic stirrer under a condition of a number of revolutions of 400 rpm. The maximum peak that appeared between a particle size of 45 μm or more and a particle size of 150 μm or less after the ultrasonic treatment and the maximum peak that appeared between a particle size of 45 μm or more and a particle size of 150 μm or less before the ultrasonic were compared.
FIG. 6 is a graph showing the particle size distribution curves of Example 1. In this figure, the peak decrease rate [=[(maximum peak height before treatment (a))−(maximum peak height after treatment (b))]/(maximum peak height before treatment (a))] was calculated. The broken line in the figure shows a graph showing the particle size distribution curve of the hBN powder before the ultrasonic treatment, and the solid line shows a graph showing the particle size distribution curve of the hBN powder after the ultrasonic treatment. It can be said that the lower the peak decrease rate is, the higher the disintegration strength is. It is to be noted that the ultrasonic treatment in the present invention was performed using an ultrasonic treatment apparatus [manufactured by NIHONSEIKI KAISHA LTD., model name "Ultrasonic Homogenizer US-150V"].
(Crystallite Size of BN Fine Powder and of hBN Powder)
The crystallite size of the BN fine powder used in each of Examples and Comparative Examples and of the hBN powder obtained in each of Examples and Comparative Examples were calculated through X-ray diffraction measurement. As an X-ray diffraction measuring apparatus, a model name "X'Pert PRO" manufactured by PANalytical B.V. was used, and Cu—Kα-1 line was used by use of a Cu target.
(Bulk Density of hBN Powder)
The hBN powder obtained in each of Examples and Comparative Examples in an amount of 100 g was put into a 300-ml measuring flask to tap the cylinder 50 times in a row from a height of 1 cm, and the tap density calculated by reading a volume value when the value did not vary for 3 sets in a row was measured as the bulk density.
(Density of Molded Body of hBN Powder)
The mass and the volume of each molded body were measured, and the density of the molded body was determined from these values.

(50% Volume Cumulative Particle size ($D_{50}$) of BN Fine Powder and hBN Powder)

The 50% volume cumulative particle size ($D_{50}$) was measured using the particle size distribution analyzer [manufactured by NIKKISO CO., LTD., model name "Microtrac MT3300EX II"].

The measurement of the particle size distribution was conducted using a dispersion liquid prepared by subjecting 0.06 g of the BN fine powder used in each of Examples and Comparative Examples or the hBN powder obtained in each of Examples and Comparative Examples to an ultrasonic treatment in 50 g of pure water for 3 minutes.

(Content of hBN Powder not Passing Through Sieve Having Opening of 45 μm)

A sieve having an opening of 45 μm, the sieve having a diameter of 20 cm, a height of 4.5 cm was prepared, and 10 g of the hBN powder obtained in each of Examples and Comparative Examples was put on the sieve to be set in a reduced pressure suction type sieving machine [manufactured by Alpine Ag., model name "Air Jet Sieve A 200 LS"]. Sieving was performed by sucking the powder from under the sieve with a differential pressure of 1 kPa for 180 seconds as the sieving time. The weight of the powder passing through the sieve and of the powder left on the sieve were measured to calculate the content of the hBN powder not passing through the sieve having an opening of 45 μm (content of powder not passing through sieve having an opening of 45 μm (% by mass)).

(Boron Oxide ($B_2O_3$) Content and Calcium Oxide (CaO) Content in hBN Powder)

The hBN powder obtained in each of Examples and Comparative Examples was subjected to an acid treatment with 0.1 N a diluted sulfuric acid solution. Through this acid treatment, boron oxide (hereinafter, also simply referred to as "$B_2O_3$") in the hBN powder dissolves in the acid solution.

Subsequently, the amount of an B element existing in the acid solution after the acid treatment was measured with an apparatus for ICP analysis [manufactured by SII Nano Technology Inc., model name "SPS 3500"]. The content of $B_2O_3$ which had dissolved through the acid treatment was calculated from the amount of the B element existing in the acid solution after the acid treatment.

A Ca element existing in the acid solution after the acid treatment was measured with the apparatus for ICP analysis, and the content of CaO was calculated from the amount of the Ca element.

(Carbon Content in hBN Powder)

The content of carbon in the hBN powder obtained in each of Examples and Comparative Examples (carbon content) was measured using a carbon analyzer [manufactured by LECO Japan Corporation, model name "C5230"].

(Purity of hBN Powder)

The total amount of the $B_2O_3$ content, the CaO content, and the carbon content in the hBN powder measured as described above were regarded as the amount of impurities to determine the purity of the hBN powder.

(Thermal Conductivity of Resin Sheet)

The thermal diffusivity was measured for the resin sheets obtained in Examples and Comparative Examples with a model name "LFA447 NanoFlash" manufactured by Erich NETZSC GmbH & Co. Holding KG. A value obtained by multiplying the thermal diffusivity value by theoretical values of the specific heat and the density of each resin sheet was determined as the thermal conductivity in the thickness direction of the resin sheet.

It is to be noted that the theoretical value of the density of the resin sheet of each of Examples and Comparative Examples was calculated assuming the theoretical density of boron nitride to be 2.27 g/cm$^3$ and the theoretical density of the resin component to be 1.17 g/cm$^3$.

(Specific Gravity Rate of Resin Sheet)

The specific gravity rate of the resin sheet obtained in each of Examples and Comparative Examples was calculated by dividing the specific gravity of the resin sheet of each of Examples or Comparative Examples, which was measured using an electronic balance (model name "CP224S") and specific gravity/density determination kit (model name "YDK01/YDK01-OD/YDK01LP") each manufactured by Sartorius Mechatronics Japan K.K. by an Archimedes method, by the theoretical specific gravity of the resin sheet of each of Examples or Comparative Examples, and then multiplying the result by 100, [(specific gravity measured for resin sheet of each of Examples or Comparative Examples/theoretical specific gravity of resin sheet of each of Examples or Comparative Examples)×100].

It is to be noted that in the calculation of the theoretical specific gravity of the resin sheet of each of Examples or Comparative Examples, the calculation was conducted assuming the theoretical density of boron nitride to be 2.27 g/cm$^3$ and the theoretical density of the resin component to be 1.17 g/cm$^3$.

(Degree of Orientation)

The degree of orientation of the resin sheet obtained in each of Examples and Comparative Examples were calculated by X-ray diffraction measurement. As an X-ray diffraction measuring apparatus, a model name "X'Pert PRO" manufactured by PANalytical B.V. was used, and Cu—Kα-1 line was used by use of a Cu target.

The degree of orientation was calculated from the intensity of a peak corresponding to a 002 plane, the peak appearing at around a diffraction angle of 2θ=26.9 degrees [I(0002)] and the intensity of a peak corresponding to a 100 plane, the peak appearing at around a diffraction angle 2θ=41.6 degrees [I(100)] by the following expression wherein the a-axis direction of the primary particles of the hBN powder is assumed to be the 002 plane and the c-axis direction of the primary particles of the hBN powder is assumed to the 100 plane.

Degree of orientation=[$I$(002)/$I$(100)]

The conditions for preparing the hBN powders of Examples and Comparative Examples described above are shown in Table 1-1 and Table 1-2, and the evaluation results are shown in Table 2.

TABLE 1-1

| BN fine powder (A) Type | Ratio [$L_2/d_2$] | $D_{50}$ μm | BET specific surface area m$^2$/g | Crystallite size Å |
|---|---|---|---|---|
| A-1 | 6.0 | 0.67 | 9.9 | 262 |
| A-2 | 8.0 | 4.50 | 11.7 | 203 |
| A-3 | 7.5 | 0.40 | 26.0 | 161 |
| AC-1 | 22.0 | 9.90 | 17.6 | 197 |

TABLE 1-2

| | Mixed powder | | | | Carbon source (C) | | |
|---|---|---|---|---|---|---|---|
| | | BN fine powder (A) | | | Graphite fine | Boron carbide | Total |
| | Type | Type | Content (% by mass) (*1) | Boron compound (B) Content (% by mass) (*1) | powder Parts by mass (*2) | Parts by mass (*2) | amount Parts by mass (*2) |
| Example 1 | X1 | A-1 | 65 | 35 | 0.0 | 3.3 | 3.3 |
| Example 2 | X1 | A-1 | 65 | 35 | 5.0 | 2.0 | 7.0 |
| Example 3 | X1 | A-1 | 65 | 35 | 0.0 | 2.2 | 2.2 |
| Example 4 | X1 | A-1 | 65 | 35 | 10.0 | 0.0 | 10.0 |
| Example 5 | X2 | A-1 | 80 | 20 | 0.0 | 1.6 | 1.6 |
| Example 6 | X4 | A-2 | 65 | 35 | 0.0 | 3.3 | 3.3 |
| Example 7 | X5 | A-3 | 65 | 35 | 0.0 | 3.3 | 3.3 |
| Comparative Example 1 | — | — | — | — | — | — | — |
| Comparative Example 2 | — | — | — | — | — | — | — |
| Comparative Example 3 | XC-1 | AC-1 | 65 | 35 | 0.0 | 3.3 | 3.3 |
| Comparative Example 4 | X3 | A-1 | 45 | 55 | 0.0 | 2.2 | 2.2 |

(*1) Content in mixed powder
(*2) Amount used in terms of carbon based on 100 parts by mass of mixed powder

TABLE 2

| | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| hBN powder | Primary particle size | μm | 3 | 6 | 4 | 3 | 5 | 5 | 3 | 10 | 10 | 4 | 3 |
| | Ratio [$L_1/d_1$] | — | 12 | 14 | 8 | 12 | 15 | 15 | 13 | 16 | 14 | 26 | 8 |
| | BET specific surface area | m²/g | 4.5 | 4.8 | 4.4 | 4.7 | 4.3 | 3.7 | 5.3 | 3.5 | 3.1 | 4.2 | 3.6 |
| | Peak decrease rate | % | 25 | 21 | 34 | 27 | 30 | 29 | 25 | 57 | 59 | 24 | 45 |
| | Crystallite size | Å | 390 | 439 | 387 | 373 | 410 | 344 | 313 | 310 | 456 | 350 | 385 |
| | Bulk density | g/cm³ | 0.80 | 0.83 | 0.75 | 0.80 | 0.81 | 0.71 | 0.77 | 0.60 | 0.70 | 0.75 | 0.53 |
| | $D_{50}$ | μm | 42 | 39 | 32 | 41 | 24 | 24 | 30 | 13 | 17 | 40 | 18 |
| | Content of powder not passing through sieve of 45 μm | % by mass | 82 | 82 | 83 | 81 | 81 | 81 | 82 | 83 | 32 | 82 | 81 |
| | $B_2O_3$ content | % by mass | 0.05 | 0.05 | 0.04 | 0.04 | 0.03 | 0.03 | 0.04 | 0.05 | 0.30 | 0.07 | 0.04 |
| | CaO content | % by mass | 0.01 | 0.01 | 0.01 | 0.01 | 0.01 | 0.01 | 0.01 | 0.01 | 0.60 | 0.01 | 0.01 |
| | Carbon content | % by mass | 0.01 | 0.02 | 0.01 | 0.01 | 0.02 | 0.02 | 0.01 | 0.01 | 0.02 | 0.01 | 0.01 |
| | Purity | % by mass | 99.9 | 99.9 | 99.9 | 99.9 | 99.9 | 99.9 | 99.9 | 99.9 | 99.1 | 99.9 | 99.9 |
| Resin sheet | Thermal conductivity | W/m·K | 27 | 22 | 23 | 22 | 23 | 23 | 25 | 20 | 8 | 15 | 20 |
| | Specific gravity ratio | % | 100 | 100 | 100 | 100 | 100 | 100 | 100 | 100 | 100 | 98 | 98 |
| | Degree of orientation | — | 15 | 20 | 22 | 15 | 25 | 24 | 20 | 31 | 114 | 26 | 22 |

It is understood from Table 2 that the hBN powders of Examples 1 to 7 exhibit a high thermal conductivity while suppressing the anisotropy because the purity is higher, the thermal conductivity of the resin sheet is higher, and the degree of orientation is lower for all the hBN powders of Examples 1 to 7 than for the hBN powders of Comparative Examples 1 to 4.

It is considered that this is because in any of Examples 1 to 7, the primary particle size is less than 10 μm, which is smaller than in Comparative Examples 1 to 4, the ratio [L1/d1] is 5.0 or more and 20 or less, the BET specific surface area is small, as small as less than 10 m²/g, the peak decrease rate is 10% or more and less than 40%, so that the primary particles of the hBN powder contact with one another while they are randomly orientated to form the dense and strong aggregate, thereby making the aggregate hard to disintegrate.

The hBN powders of Examples 1 to 7 comprises such an aggregate, and therefore it is considered that in the hBN powders of Examples 1 to 7, the aggregate can maintain a granular shape without disintegrating in the process of forming a composite with a resin in molding the resin composition comprising the hBN powder into the resin sheet, and further, in the obtained resin sheets, the primary particles of the hBN can maintain the random orientation, so that high thermal conductive properties can be exhibited, and the anisotropy can be suppressed.

This is also understood from the fact that in the hBN powder of Example 1 shown in FIG. 3, the aggregate comprises the primary particles having a smaller primary particle size than in the case of the hBN powder of Comparative Example 2 shown in FIG. 4, and primary particles are randomly orientated.

The invention claimed is:

1. A hexagonal boron nitride powder (D) comprising an aggregate of primary particles of hexagonal boron nitride, wherein the powder (D) has a primary particle size of less than 10 μm, a ratio of an average longer diameter ($L_1$) to an average thickness ($d_1$) of the primary particles, $[L_1/d_1]$, of 5.0 or more and 20 or less, a BET specific surface area of less than 10 m²/g, and a bulk density of 0.75 g/cm³ or more, wherein the average longer diameter ($L_1$) is a number average value of the longer diameters of the primary particles, the longer diameter being the maximum diameter in a planar direction of the primary particle of the powder (D) and the average thickness ($d_1$) is a number average value of the thickness of the primary particles of the powder (D), and the powder (D) has one maximum peak in a range of a particle size of 45 μm or more and 150 μm or less in a particle size distribution curve of the hexagonal boron nitride powder classified to have a particle size of 45 μm or more and 106 μm or less, and has a decrease rate of the maximum peak of 10% or more and less than 40% when a dispersion liquid obtained by dispersing the hexagonal boron nitride powder (D) in water is subjected to an ultrasonic treatment for 1 minute, the peak decrease rate being calculated by the following expression (1):

Peak decrease rate (%)={[(maximum peak height before ultrasonic treatment ($a$))−(maximum peak height after ultrasonic treatment ($b$))]/ (maximum peak height before ultrasonic treatment ($a$))}×100           (1).

2. The hexagonal boron nitride powder (D) as claimed in claim 1, having a BET specific surface area of 1.5 m²/g or more and 6.0 m²/g or less.

3. The hexagonal boron nitride powder (D) as claimed in claim 1, having a BET specific surface area of 1.5 m²/g or more and 5.0 m²/g or less.

4. The hexagonal boron nitride powder (D) as claimed in claim 1, having a crystallite size of 260 Å or more and 1000 Å or less.

5. A resin composition comprising 10% by volume or more and 90% by volume or less of the hexagonal boron nitride powder (D) as claimed in claim 1.

6. A resin sheet comprising the resin composition as claimed in claim 5 or a cured product thereof.

7. A method for producing the hexagonal boron nitride powder (D) as claimed in claim 1, the method comprising a step of mixing 100 parts by mass of a mixed powder comprising 50% by mass or more and 90% by mass or less of a boron nitride fine powder (A) and 10% by mass or more and 50% by mass or less of a boron compound (B) represented by a formula $(B_2O_3) \cdot (H_2O)_X$ wherein X=0 to 3, and 1.0 part by mass or more and 15 parts by mass or less in terms of carbon of a carbon source (C), molding a resultant mixture, and then firing a resultant under an atmosphere comprising a nitrogen gas, wherein the boron nitride fine powder (A) has a ratio of an average longer diameter ($L_2$) to an average thickness ($d_2$) of primary particles thereof, $[L_2/d_2]$, of 2.0 or more and 15 or less, a 50% volume cumulative particle size $D_{50}$ of 0.20 μm or more and 5.0 μm or less, a BET specific surface area of 5.0 m²/g or more and 30 m²/g or less, and a crystallite size of 150 Å or more and 400 Å or less, wherein the average longer diameter ($L_2$) is a number average value of the longer diameters of the primary particles of the powder (A) and the average thickness ($d_2$) is a number average value of the thicknesses of the primary particles of the powder (A).

8. The method for producing the hexagonal boron nitride powder (D) as claimed in claim 7, wherein the boron nitride fine powder (A) has a 50% volume cumulative particle size $D_{50}$ of 0.20 μm or more and 1.0 μm or less.

9. The method for producing the hexagonal boron nitride powder (D) as claimed in claim 7, wherein the boron nitride fine powder (A) has a BET specific surface area of 5.0 m²/g or more and 20 m²/g or less.

10. The method for producing the hexagonal boron nitride powder (D) as claimed in claim 7, wherein the boron nitride fine powder (A) has a crystallite size of 200 Å or more and 400 Å or less.

11. The method for producing the hexagonal boron nitride powder (D) as claimed in claim 7, the method comprising a step of mixing 100 parts by mass of the mixed powder comprising 50% by mass or more and 90% by mass or less of the boron nitride fine powder (A) and 10% by mass or more and 50% by mass or less of the boron compound (B) represented by the formula $(B_2O_3) \cdot (H_2O)_X$ wherein X=0 to 3, and 1.0 part by mass or more and 15 parts by mass or less in terms of carbon of the carbon source (C), molding the resultant mixture, and then firing the resultant under an atmosphere comprising a nitrogen gas, wherein the boron nitride fine powder (A) has a ratio of the average longer diameter ($L_2$) to the average thickness ($d_2$) of the primary particles thereof, $[L_2/d_2]$, of 2.0 or more and 15 or less, a 50% volume cumulative particle size $D_{50}$ of 0.20 μm or more and 1.0 μm or less, a BET specific surface area of 5.0 m²/g or more and 20 m²/g or less, and a crystallite size of 200 A or more and 400 Å or less, wherein the average longer diameter ($L_2$) is a number average value of the longer diameters of the primary particles of the powder (A) and the average thickness ($d_2$) is a number average value of the thicknesses of the primary particles of the powder (A).

12. The method for producing the hexagonal boron nitride powder (D) as claimed in claim 7, wherein the carbon source (C) is one or two selected from the group consisting of graphite and boron carbide.

* * * * *